(12) United States Patent
Cole et al.

(10) Patent No.: US 10,077,540 B2
(45) Date of Patent: Sep. 18, 2018

(54) CORROSION-RESISTANT FLUID MEMBRANE

(71) Applicant: HYPERLOOP TECHNOLOGIES, INC., Los Angeles, CA (US)

(72) Inventors: Blake Cole, Redondo Beach, CA (US); Israel Stol, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/434,622

(22) Filed: Feb. 16, 2017

(65) Prior Publication Data
US 2017/0233977 A1 Aug. 17, 2017

Related U.S. Application Data

(60) Provisional application No. 62/295,828, filed on Feb. 16, 2016.

(51) Int. Cl.
| | | |
|---|---|---|
| *E02D 29/09* | (2006.01) | |
| *B01D 61/02* | (2006.01) | |
| *C23F 13/02* | (2006.01) | |
| *E02D 29/067* | (2006.01) | |
| *E21D 11/38* | (2006.01) | |
| *B01D 61/04* | (2006.01) | |
| *B01D 61/10* | (2006.01) | |

(Continued)

(52) U.S. Cl.
CPC ............ *E02D 29/06* (2013.01); *B01D 61/025* (2013.01); *B01D 61/04* (2013.01); *B01D 61/10* (2013.01); *C04B 32/02* (2013.01); *C23F 13/02* (2013.01); *C25D 9/08* (2013.01); *E02B 3/04* (2013.01); *E02D 29/067* (2013.01); *E21D 11/383* (2013.01); *B01D 61/08* (2013.01); *B01D 2311/103* (2013.01); *B01D 2313/23* (2013.01); *B01D 2313/38* (2013.01);
(Continued)

(58) Field of Classification Search
CPC ........ B01D 61/025; F16L 9/18; F16L 53/002; F16L 58/00; C02F 1/441; C02F 2103/08; E02D 29/06; E02D 29/067; E21D 11/383; C23F 2213/31

See application file for complete search history.

(56) References Cited

U.S. PATENT DOCUMENTS

| | | | |
|---|---|---|---|
| 2,200,469 | A | 5/1940 | Cox |
| 4,246,075 | A | 1/1981 | Hilbertz |

(Continued)

FOREIGN PATENT DOCUMENTS

| | | |
|---|---|---|
| WO | WO 2008/041862 | 4/2008 |
| WO | WO 2013/002644 | 1/2013 |
| WO | WO 2015/171902 | 11/2015 |

OTHER PUBLICATIONS

Goreau, "Marine Electrolysis for Building Materials and Environmental Restoration", INTECH, 2012, pp. 274-290.

(Continued)

*Primary Examiner* — Carib A Oquendo
(74) *Attorney, Agent, or Firm* — Greenblum & Bernstein, P.L.C.

(57) ABSTRACT

A corrosion-resistant cover system, having a corrosion-resistant cover structured and configured to be arrangeable around an object having one or more metallic surfaces that are susceptible to corrosion. The corrosion-resistant cover is operable to provide increased corrosion resistance to the object by preventing contact between the one or more metallic surfaces and ambient conditions exterior to the corrosion-resistant cover.

18 Claims, 21 Drawing Sheets

(51) Int. Cl.
    *C04B 32/02*    (2006.01)
    *C25D 9/08*    (2006.01)
    *E02B 3/04*    (2006.01)
    *C02F 1/44*    (2006.01)
    *C02F 103/08*    (2006.01)
    *B01D 61/08*    (2006.01)

(52) U.S. Cl.
    CPC .......... *C02F 1/441* (2013.01); *C02F 2103/08* (2013.01); *C02F 2303/08* (2013.01); *C23F 2213/31* (2013.01)

(56) References Cited

U.S. PATENT DOCUMENTS

| | | |
|---|---|---|
| 5,127,441 A | 7/1992 | Rains |
| 5,961,837 A | 10/1999 | Ferrara et al. |
| 6,105,941 A | 8/2000 | Buchanan et al. |
| 6,450,734 B1 | 9/2002 | Kuja et al. |
| 7,186,327 B1 | 3/2007 | Russell |
| 2003/0116214 A1* | 6/2003 | Meli ................ F16L 13/0272 138/123 |
| 2006/0196568 A1* | 9/2006 | Leeser ................ F16L 9/18 138/149 |
| 2007/0215546 A1 | 9/2007 | Watkins et al. |
| 2008/0296890 A1* | 12/2008 | Prescott ................ F16L 7/02 285/47 |
| 2013/0068465 A1* | 3/2013 | Critsinelis ................ E21B 17/01 166/344 |
| 2013/0087238 A1 | 4/2013 | Mercier |
| 2017/0074446 A1* | 3/2017 | Sumner ................ F16L 59/143 |

OTHER PUBLICATIONS

Int'l Search Report and Written Opinion issued in counterpart Patent Application No. PCT/US17/18175, dated May 10, 2017.

\* cited by examiner

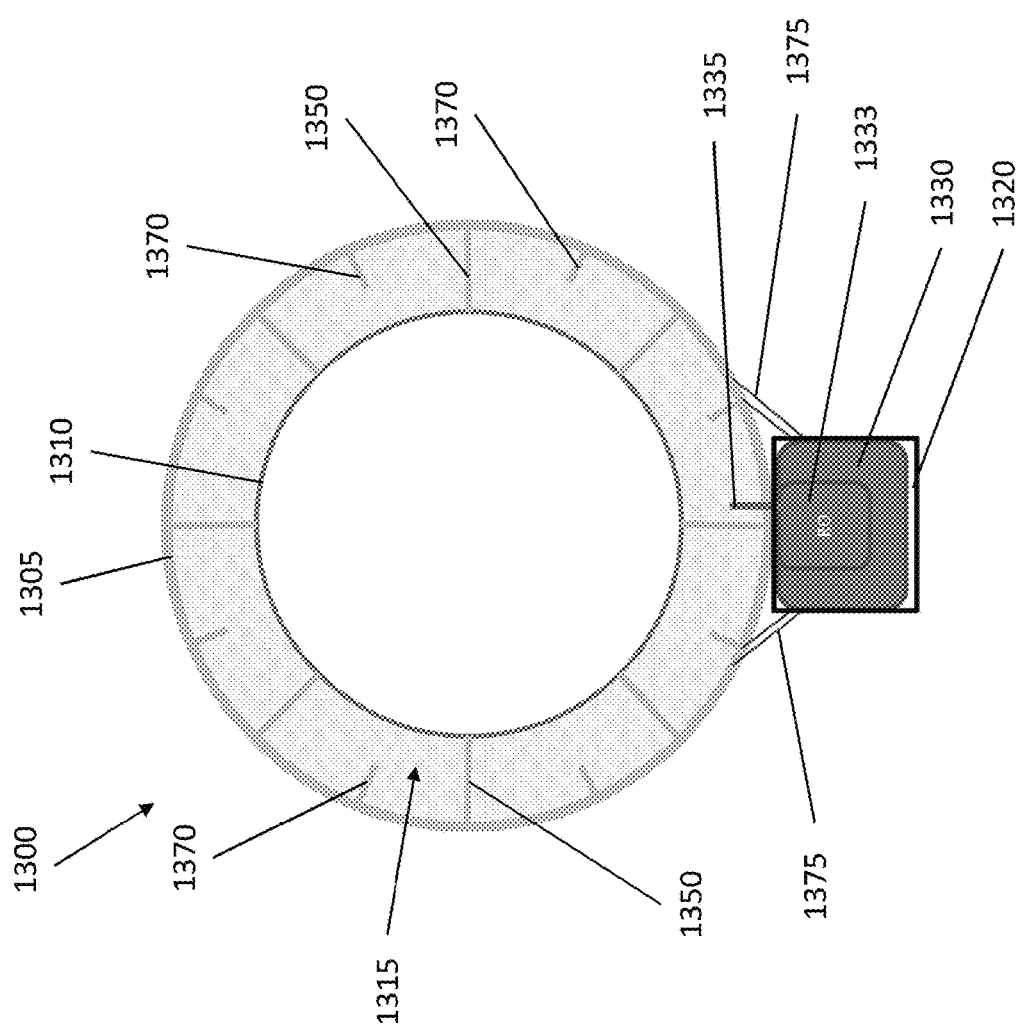

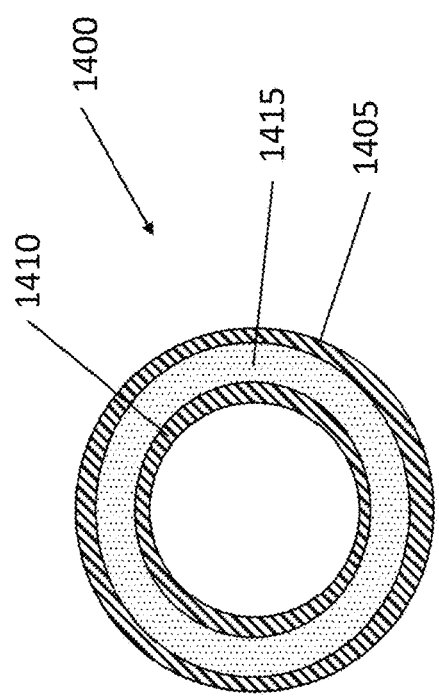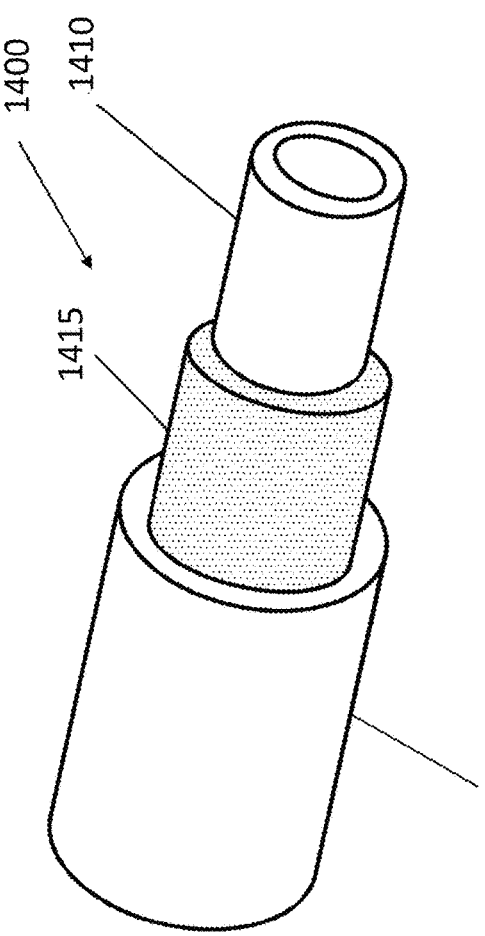

CORROSION-RESISTANT FLUID MEMBRANE

CROSS-REFERENCE TO RELATED APPLICATION

The present application claims the benefit of U.S. Provisional Application No. 62/295,828, filed Feb. 16, 2016, the contents of which are expressly incorporated herein by reference in their entirety.

FIELD OF THE DISCLOSURE

The present disclosure relates to corrosion-resistant structures, and more particularly a fluid impermeable membrane or cover or case that is corrosion-resistant (e.g., corrosion-resistant fluid membranes), and methods and systems for providing corrosion resistance, for example, for a metal tube arranged within a body of water (e.g., a submerged floating tunnel (SFT)).

BACKGROUND OF THE DISCLOSURE

Traditional transportation modes via water, land, rail, and air revolutionized the movement and growth of our current culture. The adverse environmental, societal and economic impacts of these traditional modes of transportation, however, initiated a movement to find alternative modes of transportation that take advantage of the significant improvements in transportation technology so as to more efficiently move people and/or materials between locations. High-speed transportation systems utilizing rails or other structural guidance components have been contemplated as a solution to existing transportation challenges, while improving safety, decreasing the environmental impact of traditional modes of transportation, and reducing the overall time commuting between, for example, major metropolitan communities.

Particular high speed, high efficiency transportation systems utilize a low pressure environment in order to reduce drag on a vehicle at high operating speeds, thus providing the dual benefit of allowing greater speed potential and lowering the energy costs associated with overcoming drag forces. These transportation systems may use a near vacuum environment within a tubular structure. In embodiments, these tubular structures may comprise metal alloy (e.g., steel) and or composite materials, and may have a metal outer surface.

In embodiments, these tubular structures may be arranged in (e.g., partially or completely submerged) and/or over bodies water (e.g., fresh and/or salt water). Bodies of water include, for example, oceans, bays, rivers, sea channels (e.g., deep, narrow sea channels), and lakes, (e.g., deep lakes). For example, a submerged floating tunnel (SFT), also called a suspended tunnel or Archimedes bridge, is a tunnel that floats in water, supported (at least partially) by its buoyancy (for example, by employing the hydrostatic thrust, or Archimedes' principle). The tube may be placed under water, deep enough to avoid water traffic and weather, for example, at a depth of 20-50 m (60-150 ft). Cables, for example, anchored to the Earth and/or to pontoons at the surface prevent the SFT from floating to the surface or submerging, respectively. As should be understood, once arranged in position (e.g., under the surface of a body of salt water), the tubular structures are intended to remain in working position for extended periods of time (e.g., decades).

Submerged floating tunnels (or tubes) allow construction of a tunnel in deep water, where conventional bridges or tunnels are technically difficult or prohibitively expensive. SFTs are able to deal with seismic disturbances and weather events more easily (as they have some degree of freedom in regards to movement), and their structural performance may be independent of length (that is, the tube structure can be very long without compromising its stability and resistance).

When in these underwater salt environments, however, the tubular structures are susceptible to degradation (e.g., corrosion). Corrosion is the gradual destruction of materials (usually metals) by chemical and/or electrochemical reaction with their environment. In the most common use of the word, corrosion indicates electrochemical oxidation of metal in reaction with an oxidant such as oxygen or sulfur. Corrosion is a natural process, which converts a refined metal to a more chemically-stable form, such as its oxide, hydroxide, or sulfide. Corrosion engineering is the field dedicated to controlling and stopping corrosion. Rusting, which includes the formation of iron oxides, is a well-known example of electrochemical corrosion. This type of damage typically produces oxide(s) or salt(s) of the original metal, and results in a distinctive orange coloration. Corrosion can also occur in materials other than metals, such as ceramics or polymers, although in this context, the term "degradation" is more common. Corrosion degrades the useful properties of materials and structures including strength, appearance and permeability to liquids and gases.

The marine environment is one of the most brutally corrosive eco-systems in the world. Unprotected structures may erode prematurely, resulting in corrosion of structure and a weaker structure. Metallic surfaces are subject to corrosion by ions found in seawater and sea-air. This corrosion can result in structural failure, which often leads to a loss of profits, efficiency, and/or human life. Corrosion may be especially problematic at shallower depths and/or at the air/water interface.

The most common methods of preventing structural failure are: performance of frequent maintenance, and sacrificial treatments, such as, application and reapplication of anode coatings to metallic surfaces, installing an impressed current cathode protection system, or creating very thick metallic surfaces.

Additionally, surface treatments, such as epoxy-based coatings (which may be more long-lasting then the sacrificial treatments) may be applied to structures to retard corrosion. Great care, however, must be taken to ensure complete coverage, without gaps, cracks, or pinhole defects. Small defects, for example, can act as an "Achilles' heel," allowing corrosion to penetrate the interior and causing extensive damage even while the outer protective layer remains apparently intact for a period of time.

Existing surface-treatment protection systems utilize a layer wrapped around the structure (e.g., steel and/or concrete pillars) that is designed to reduce corrosion on marine structures in environments where conditions may be too severe for paint systems, epoxies and other conventional forms of protection. The protection system seals out oxygen and water, effectively stopping corrosion on metal surfaces. The system also prevents spalling and corrosion of steel reinforcement in concrete piles. The system may encapsulate wharf piles, riser pipes and exposed piping in splash and intertidal zones. By sealing out the oxygen and water, the wrapping system effectively stops corrosion on metal surfaces, and also prevents loosening and corrosion of steel reinforcement in concrete piles. The marine piling wraps, (and jackets), coatings and petrolatum tapes are designed to protect assets for many years.

These methods of prevention, however, can often be costly and time consuming. Current practices do not utilize an efficient, cost-effective alternative to prevent seawater or sea air corrosion to metallic surfaces. Thus, while corrosion-prevention measures exist, there is a need in the art for further improved corrosion-prevention structures, systems, and methods for underwater environments.

SUMMARY OF THE EMBODIMENTS OF THE DISCLOSURE

At least some embodiments of the present disclosure are directed to a corrosion-resistant cover system, comprising a corrosion-resistant cover structured and configured to be arrangeable around an object having one or more metallic surfaces that are susceptible to corrosion. The corrosion-resistant cover is operable to provide increased corrosion resistance to the object by preventing contact between the one or more metallic surfaces and ambient conditions exterior to the corrosion-resistant cover.

In embodiments, the corrosion-resistant cover is operable to provide one or more fluid channels between an interior of the corrosion-resistant cover and the one or more metallic surfaces of the object.

In further embodiments, the system further comprises one or more pumping assemblies operable to inject a treated fluid into the one or more fluid channels.

In additional embodiments, the the one or more pumping assemblies each comprise a pump operable to move yet-treated fluid or the treated fluid through the pumping assembly.

In yet further embodiments, the one or more pumping assemblies each further comprise one or more fluid treaters operable to receive an incoming fluid and treat the incoming fluid in order to change one or more properties of the incoming fluid, and to output the treated fluid.

In embodiments, the one or more fluid treaters comprise at least one of a desalinizator, a deoxidizer, a pH adjustor, and an additive supplier.

In some embodiments, the one or more pumping assemblies further comprises a controller operable to receive instructions and control one or more pumps and one or more fluid treaters of the pumping assembly.

In additional embodiments, the one or more pumping assemblies further comprises a fluid tester operable to determine and/or quantify properties of an incoming fluid.

In yet further embodiments, the one or more pumping assemblies further comprises a heat pump and a heat exchanger, wherein the heat exchanger is configured to receive thermal energy from the heat pump and transfer the thermal energy to an incoming fluid or to the treated fluid, to increase a temperature of the incoming fluid or the treated fluid.

In embodiments, the one or more pumping assemblies further comprises a heat exchanger and a turbine, wherein the heat exchanger is configured to transfer received thermal energy to the turbine for driving the treated fluid through the one or more channels.

In further embodiments, the one or more pumping assemblies each comprise an inlet in communication with an ambient fluid exterior to the corrosion-resistant cover and an outlet in communication with the one or more fluid channels.

In additional embodiments, the system further comprises one or more baffles depending from an interior surface of the corrosion-resistant cover, which are operable to prevent a backflow of treated liquid within the one or more channels.

In yet further embodiments, the system further comprises one or more studs structured and arranged within the channel to maintain a gap between the corrosion-resistant cover and the one or more metallic surfaces of the object.

In embodiments, the system further comprises one or more helical fins structured and arranged within the channel to promote a circumferential component of flow to the treated fluid within the channel.

In some embodiments, the system further comprises studs that do not traverse an entire width of the channel structured and arranged within the channel to induce mixing and/or homogeneity of the treated fluid passing through the channel.

In certain embodiments, the object comprises a hollow metal tube of a transportation system in an underwater environment.

In some embodiments, the corrosion-resistant cover comprises an accretion layer formed on the outer surface of the metal tube.

Additional aspects of the disclosure are directed to a method of providing corrosion resistance to a metal tube in an underwater environment. The method comprises arranging a corrosion-resistant cover around the metal tube such that the metal tube is protected from contact with ambient seawater of the underwater environment, and so that one or more fluid channels are provided between an interior surface of the corrosion-resistant cover and the outer surface of the metal tube, intaking ambient seawater into a pumping assembly comprising one or more pumps and one or more fluid treatment devices, treating the ambient seawater with the one or more fluid treatment devices to produce a treated fluid having reduced corrosive properties, and injecting the treated fluid into the one or more channels such that the treated fluid having reduced corrosive properties is in contact with the outer surface of the metal tube In embodiments, the treated fluid having reduced corrosive properties has at least one of: a lowered salt concentration than that of the ambient seawater, a reduced oxygen content than that of the ambient seawater, and an increased a pH value than that of the ambient seawater.

In some embodiments, the method further comprises applying an electrical current to the outer surface of the metal tube while passing the treated fluid through the one or more channels to form an accretion layer on the outer surface of the metal tube.

BRIEF DESCRIPTION OF THE DRAWINGS

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the disclosure in conjunction with the following exemplary and non-limiting drawings wherein:

FIGS. 13A and 13B show exemplary and non-limiting composite tube structures in accordance with aspects of the disclosure;

FIGS. 14A-14C schematically depict aspects of exemplary corrosion-resistance systems in accordance with aspects of the disclosure;

DETAILED DISCLOSURE OF EMBODIMENTS OF THE DISCLOSURE

Figure 1:
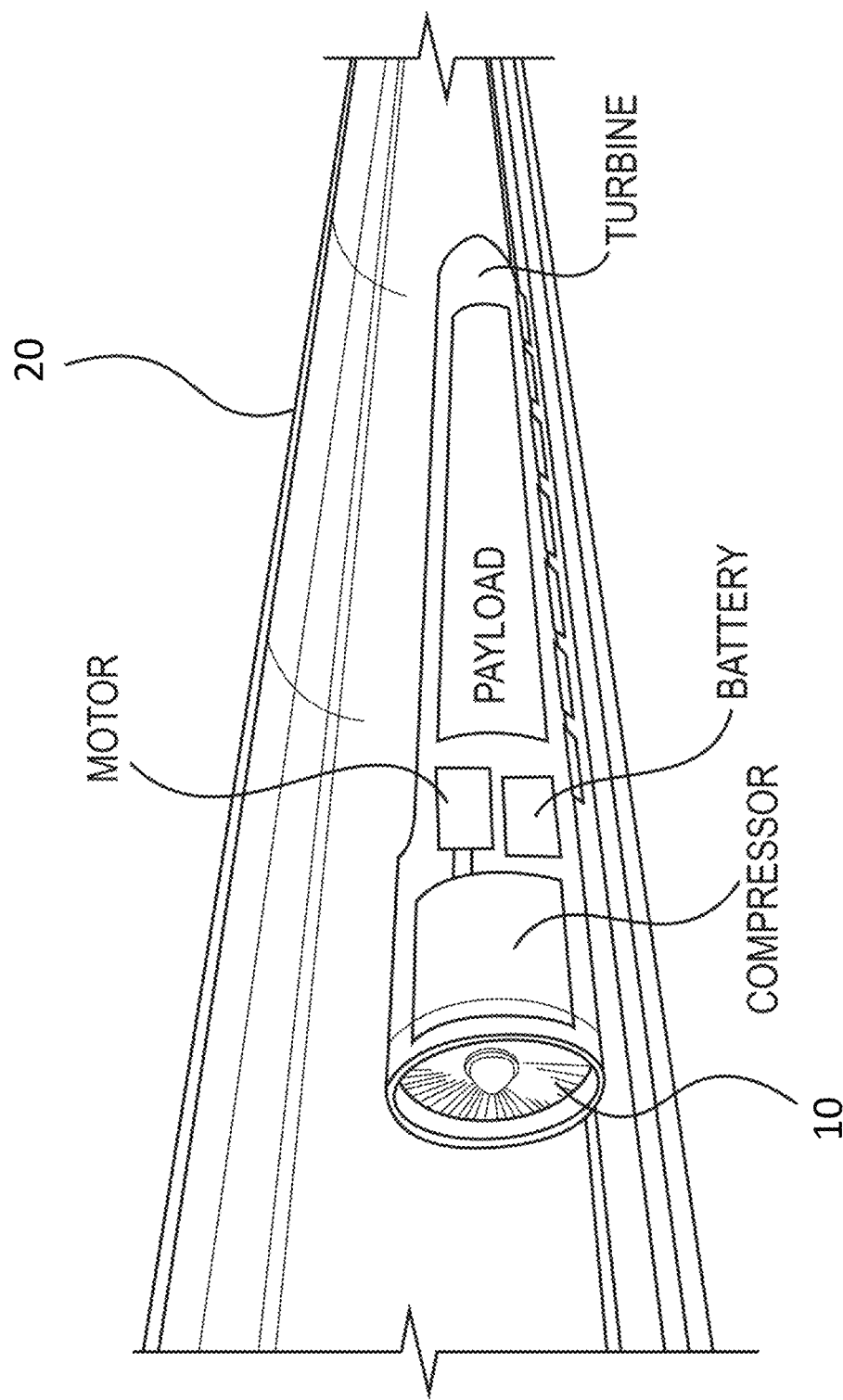
FIG. 1 shows an exemplary and non-limiting depiction of a transportation system in accordance with aspects of the disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also indicate that mixtures of one or more magnetic materials can be present unless specifically excluded. Put another way, for example, as used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" indicates "only A, or only B, or both A and B." In the case of "only A," the term also covers the possibility that B is absent, i.e. "only A, but not B."

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

The various embodiments disclosed herein can be used separately and in various combinations unless specifically stated to the contrary.

Embodiments of the present disclosure may be used in a transportation system, for example, as described in commonly-assigned application Ser. No. 15/007,783, titled "Transportation System," the contents of which are hereby expressly incorporated by reference herein in their entirety.

A high speed, high efficiency transportation system utilizes a low pressure environment in order to reduce drag on a vehicle at high operating speeds, thus providing the dual benefit of allowing greater speed potential and lowering the energy costs associated with overcoming drag forces. These systems may use a near vacuum within a tubular structure. These systems utilize any number of acceleration systems to achieve the high speed allowed, including, for example, electromagnetic levitation.

Referring now to FIG. 1, an exemplary and non-limiting transportation system is illustrated. The transportation system includes a capsule or transport pod 10 that is movable within a tube 20 having an interior maintained as a near-vacuum environment.

Figure 2:
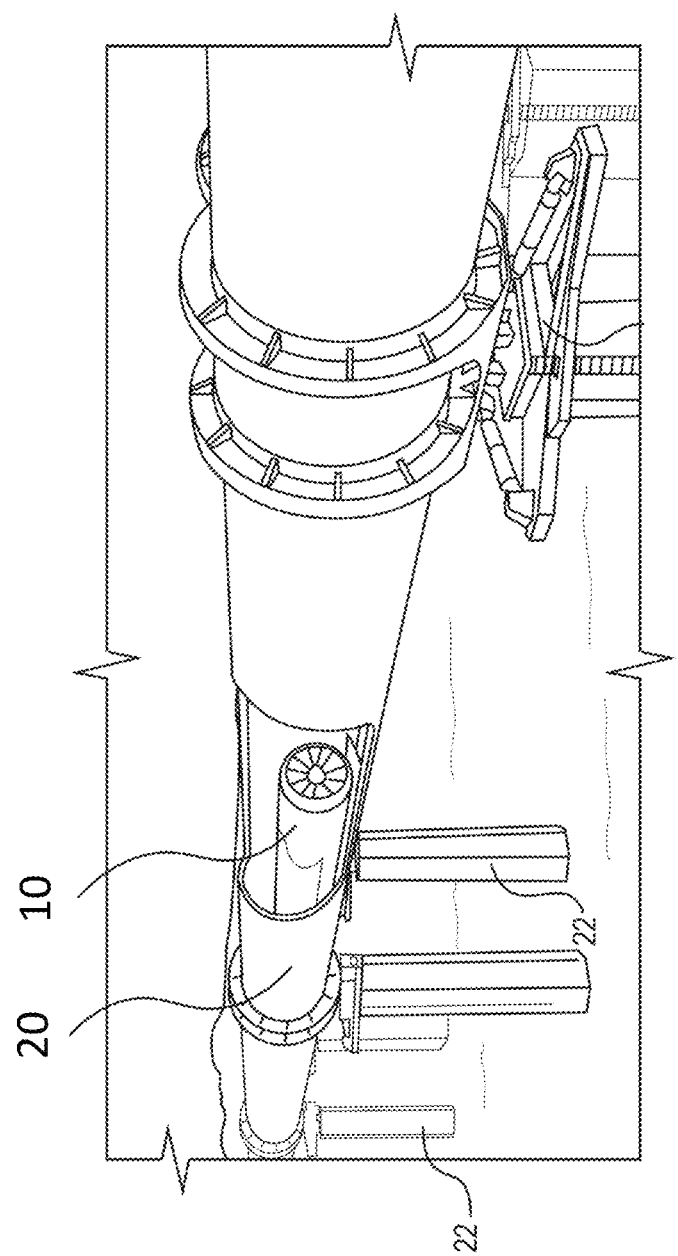
FIG. 2 shows an exemplary and non-limiting depiction of the transportation system in accordance with aspects of the disclosure.

Referring now to FIG. 2, one or more tubes 20 of transportation system is illustrated in greater detail. As shown in FIG. 2, in one exemplary and non-limiting embodiment of the present disclosure, a capsule 10 is traveling through the tube 20, which may be supported above a ground surface (e.g., in an underwater environment) by a series of supports (e.g., pillars 22) spaced apart along a path of travel.

While many high-speed transportation systems have been proposed or adopted, this vacuum-enabled system is believed to be the most efficient way to connect sister-cities or clusters of destinations that are within, for example, 900 miles of each other. Possibly the single greatest cost associated with the project, however, may be the tubular structure, e.g., made from a metal alloy, which spans the entire length of the project.

Figure 3:
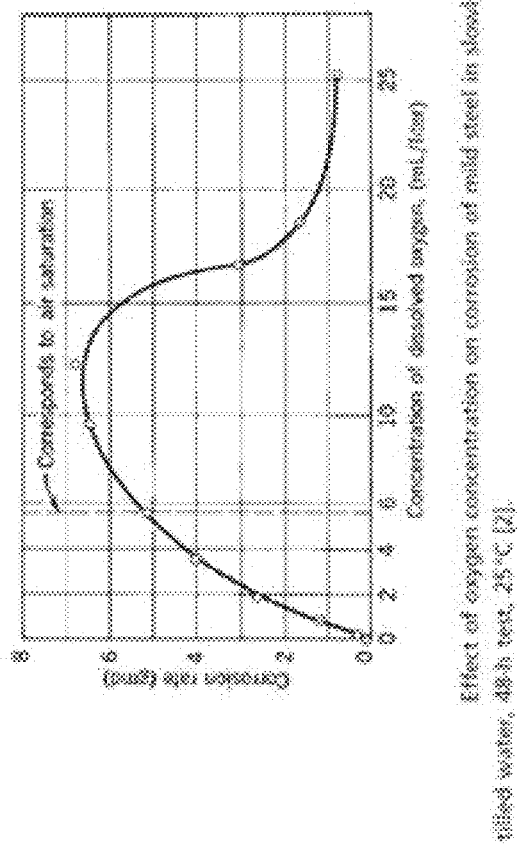
FIG. 3 is a graph showing the effect of oxygen concentration on corrosion of mild steel in slowly moving distilled water in accordance with aspects of the disclosure.

The graph of FIG. 3 shows the effect of oxygen concentration on corrosion of mild steel in slowly moving distilled water. For example, as shown in the graph of FIG. 3, below approximately 10 mL/liter, with decreasing concentrations of dissolved oxygen, corrosion rates decrease. The amount of oxygen present in an environment (and its ability to absorb electrons) dictates the rate of oxidation (corrosion) of metal. In accordance with aspects of the disclosure, by reducing the oxygen concentration of the fluid in contact with the outer surface of the metal tube (which may be susceptible to corrosion), the rate of corrosion of the metal tube may be reduced, and the degradative effects of corrosion can be reduced.

Figure 4:
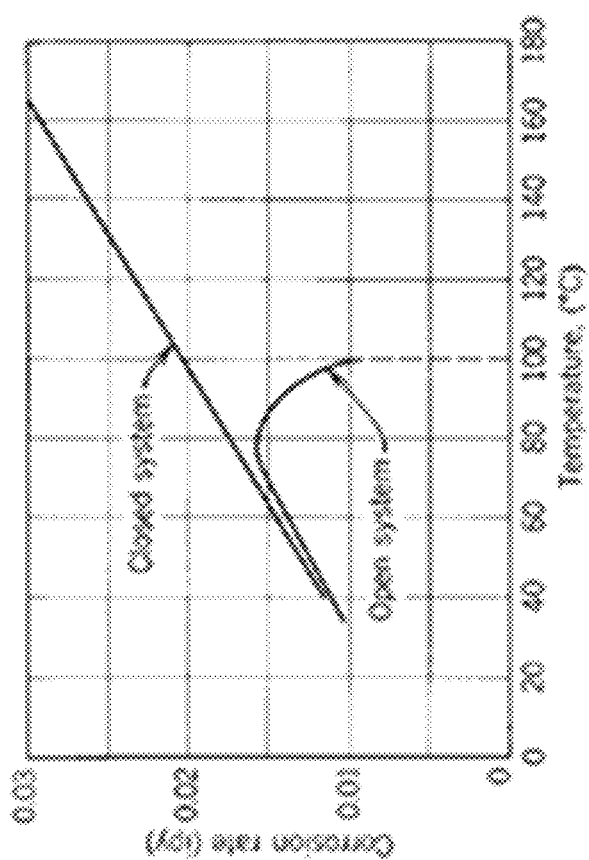
FIG. 4 is a graph showing the effect of temperature on corrosion of iron in water containing dissolved oxygen in accordance with aspects of the disclosure.

In accordance with aspects of the disclosure, in some embodiments by location below the sea surface, an underwater tube, e.g., an SFT, is, to some extent, at reduced risk for corrosion. The graph of FIG. 4 shows the effect of temperature on corrosion of iron in water containing dissolved oxygen. As shown in FIG. 4, corrosion rates can increase with increased temperature. Additionally, colder-temperature water may contain less dissolved oxygen. Thus, in accordance with aspects of the disclosure, by arranging the tube in a relatively colder environment (e.g., deeper in a body of water), the effects of corrosion on the metal tube can be reduced.

As discussed above, salt concentrations also impact the rate of corrosion. For example, typical corrosion rate of steel in seawater: 25 gmd (or 0.005 ipy or 0.3 mm/yr). On average, seawater in the world's oceans has a salinity of about 3.5% (35 g/L, or 0.600 M). Every kilogram (roughly one liter by volume) of seawater has approximately 35 grams (1.2 oz) of dissolved salts (predominantly sodium (Na+) and chloride (Cl−) ions). Seawater pH is typically limited to a range between 7.5 and 8.4.

Figure 5:
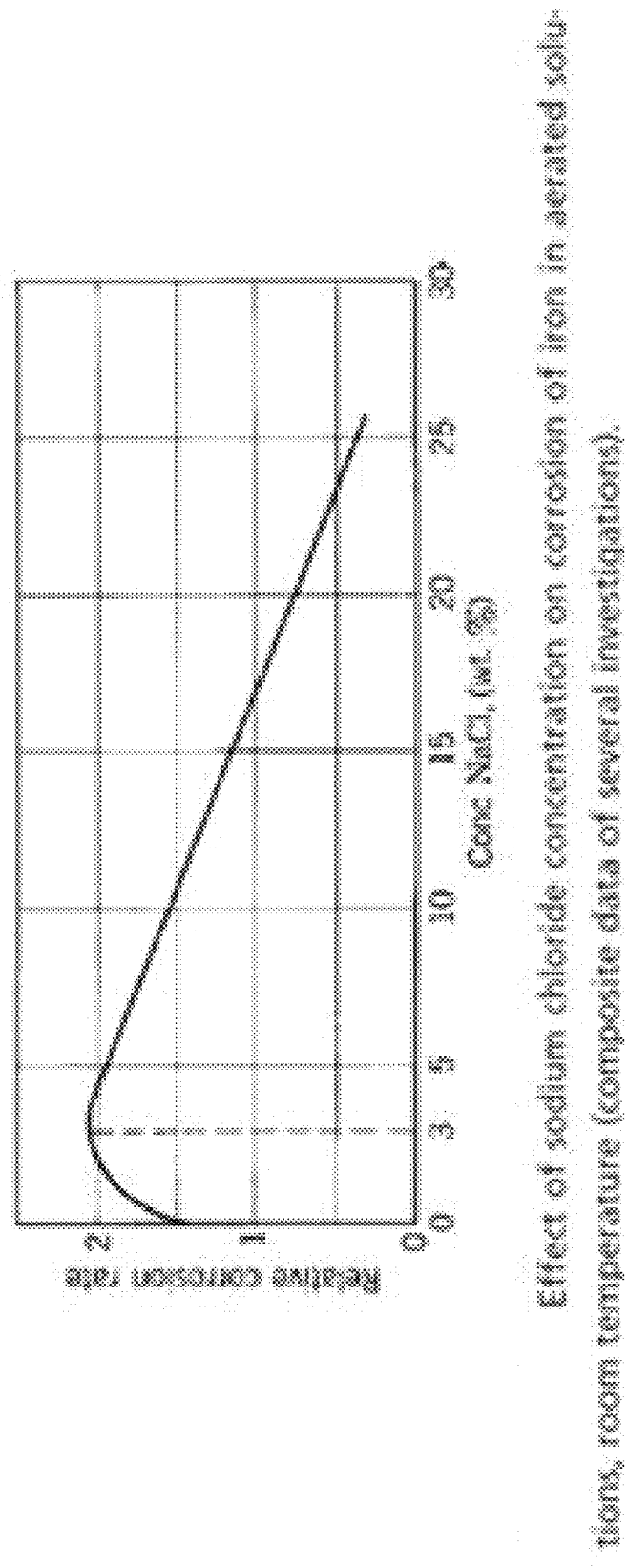
FIG. 5 is a graph showing an effect of sodium chloride concentration on corrosion of iron in aerated solutions at room temperature in accordance with aspects of the disclosure.

The graph of FIG. 5 shows an effect of sodium chloride concentration on corrosion of iron in aerated solutions at room temperature. As shown in the exemplary graph of FIG. 5, between a sodium chloride concentration (by wt %) of 0 and 3, corrosion rate can increase with increased sodium chloride concentration. Above a sodium chloride concentration of 3%, with increasing sodium chloride concentration, the corrosion rate begins to decline. As seawater has an average sodium chloride concentration (by wt %) of about 3.5%, it should be understood that the exemplary graph of FIG. 5 indicates a high relative corrosion rate. In accordance with aspects of the disclosure, by reducing the salt (e.g. sodium chloride) concentration of the fluid in contact with the outer surface of the metal tube (which may be susceptible to corrosion), the rate of corrosion on the metal tube may be reduced, and the degradative effects of corrosion can be reduced. In accordance with further aspects of the disclosure, in embodiments, depending for example on the materials utilized, increasing the salt concentration of the fluid in contact with the outer surface of the metal tube (which may be susceptible to corrosion) may reduce the rate of corrosion on a tube and/or may increase the rate of growth of protective layers over the tube (for example, as discussed below), such that the degradative effects of corrosion are reduced.

Figure 6:
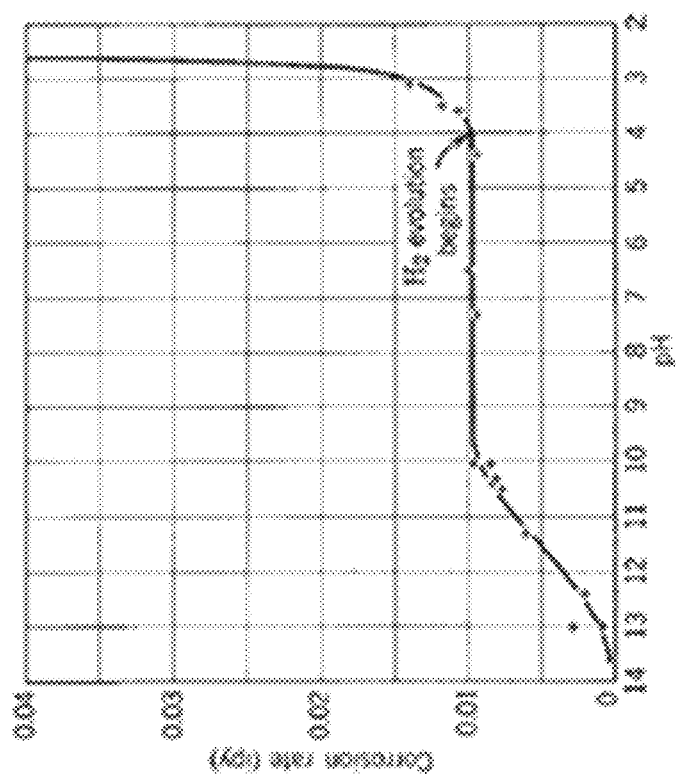
FIG. 6 is a graph showing an effect of pH on corrosion of iron in aerated soft water at room temperature in accordance with aspects of the disclosure.

The graph of FIG. 6 shows an effect of pH level on corrosion of iron in aerated soft water at room temperature. As illustrated, in FIG. 6, iron corrodes slower in a neutral or basic fluid. For example, as shown in the exemplary graph of FIG. 6, between a pH of approximately 4 and 10, the corrosion rate remains relatively constant (or flat). Below a pH value of 4, the corrosion rate begins to increase at an exponential rate. As also shown in the exemplary graph of FIG. 6, the corrosion rate decreases above a pH value of approximately 10. As pH of seawater is typically limited to a range between about 7.5 and 8.4, it should be understood that the exemplary graph of FIG. 6 indicates a corrosion rate within the relatively flat region. In embodiments, a fluid may be treated to increase the basicity of the fluid in contact with the outer surface of the tube. In accordance with aspects of the disclosure, by increasing the pH value of the fluid in contact with the outer surface of the metal tube (which may be susceptible to corrosion), the rate of corrosion of the metal tube may be reduced, and the degradative effects of corrosion can be reduced. In exemplary and non-limiting embodiments, the pH value may be increased, for example, to a relatively higher pH value, to a pH greater than 8.4, or to a pH greater than 10). In accordance with further aspects of the disclosure, depending on materials used, by decreasing the pH value of the fluid in contact with the outer surface of the tube (which may be susceptible to corrosion), the rate of corrosion of the tube may be reduced, and the degradative effects of corrosion can be reduced.

The present disclosure is related to a structure, for example, a case or outer shell (e.g., a fluid-impermeable membrane) that is resistant to corrosion. In embodiments, the structure may be a case and may comprise a flexible, corrosion-resistant material. The case may be configured to substantially encapsulate the metallic surface of an object such that a cavity or channel is formed in between the case and the metallic surface of the object. For example, in accordance with aspects of the disclosure, the structure is arranged to surround walls of a metal tube such that one or more channels are provided between the tube and the structure. For example, in embodiments, a hypoxic zone (e.g., a small hypoxic zone) is created between the outer shell and metallic surface of the tube. In accordance with some aspects of the disclosure, the structure prevents (or reduces) contact between the outer surfaces of the tube and the seawater (having, for example, average ambient salt concentration, average ambient oxygen concentration, and/ or ambient pH).

In accordance with further aspects of the disclosure, in embodiments a fluid having reduced sodium chloride concentration, reduced oxygen concentration, and/or increased pH value is passed through (e.g., passively, and/or using, e.g., pumps) the one or more channels such that the fluid having reduced sodium chloride concentration, reduced oxygen concentration, and/or increased pH value is in contact with the outer surfaces of the metal tube. In accordance with aspects of the disclosure, by reducing the sodium chloride concentration and/or oxygen concentration and/or increasing the pH value of the fluid that is in contact with the outer surface of the tube (which is susceptible to corrosion), the extent of corrosion, for example, attributable to increased salt concentration levels, increased oxygen concentrations, and/or lower pH values, can be reduced and the degradative effects of corrosion on the metal tube can be reduced. In accordance with further aspects of the disclosure, with other materials, by increasing the sodium chloride concentration and/or oxygen concentration and/or decreasing the pH value of the fluid that is in contact with the outer surface of the tube (which is susceptible to corrosion), the extent of corrosion, for example, attributable to decreased salt concentration levels, decreased oxygen concentrations, and/or higher pH values, can be reduced and the degradative effects of corrosion on the tube can be reduced.

Further aspects of the disclosure are directed methods and apparatuses operable to reduce the oxygen and/or salt concentrations in fluids in regions (e.g., one or more channels) surrounding, for example, the metal tubular structure. For example, in embodiments, a deoxidizer may be used to reduce oxygen concentration of treated water, and/or a reverse osmosis desalinization system may be used to reduce salt content of treated water. Additionally, a pH adjuster may be used to adjust (e.g., raise) a pH value of water. In further embodiments, for example, a retentiate output of a reverse osmosis desalinization system may be used to increase salt content of treated water.

Figure 7:
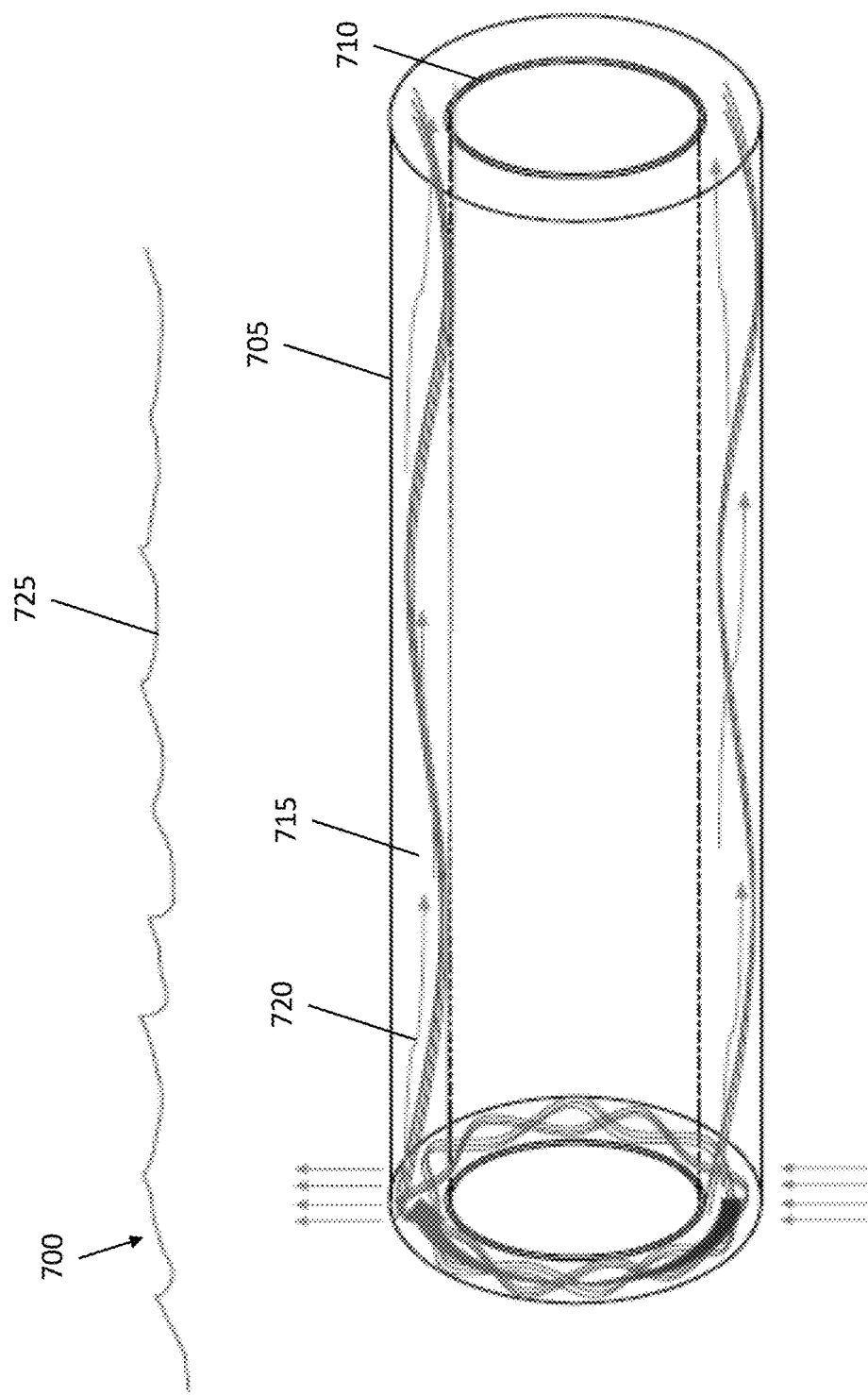
FIG. 7 shows an exemplary and non-limiting schematic depiction of a corrosion-resistant fluid membrane system in accordance with aspects of the disclosure.

FIG. 7 shows an exemplary and non-limiting schematic depiction of a corrosion-resistant fluid membrane system 700 in accordance with aspects of the disclosure. The corrosion-resistant fluid membrane system 700 includes a corrosion-resistant fluid membrane 705. In embodiments, the fluid membrane 705 is impermeable (or substantially impermeable) to water. As shown in FIG. 7, in one embodiment, the corrosion-resistant fluid membrane system 700 may be employed upon (and/or around) a hollow tubular structure 710. As shown in FIG. 7, the corrosion-resistant fluid membrane may substantially surround, for example, a metallic hollow tubular structure 710.

While the schematic depiction of FIG. 7 illustrates a section of tube (e.g., tubular structure 710), it should be understood that a transportation system may utilize one or more corrosion-resistant fluid membrane systems 700 arranged serially along the path of the transportation tube. In embodiments, these serially-arranged corrosion-resistant fluid membrane systems 700 may be discrete or may share and/or jointly utilize shared components.

As shown in FIG. 7, in embodiments, the metallic hollow tubular structure 710 may be submerged (e.g., partially or completely) under a surface of water 725 (e.g., seawater or freshwater), thereby potentially exposing the metallic hollow tubular structure 710 (if unprotected) to corrosion. In accordance with aspects of the disclosure, the exemplary and non-limiting corrosion-resistant fluid membrane 705 is structured and arranged to prevent contact between the metallic hollow tubular structure 710 and the seawater. In accordance with further aspects of the disclosure, the exemplary and non-limiting corrosion-resistant fluid membrane 705 is structured and arranged to provide a channel 715 for flow of a fluid 720 in a direction (e.g., a single direction or multiple directions) around the metallic hollow tubular structure 710 between an inner surface of the membrane 705 and an outer surface of the tubular structure 710. In accordance with aspects of the disclosure, the fluid 720 is flowed through the channel 715 to provide corrosion resistance to the tubular structure 710.

Figure 8:
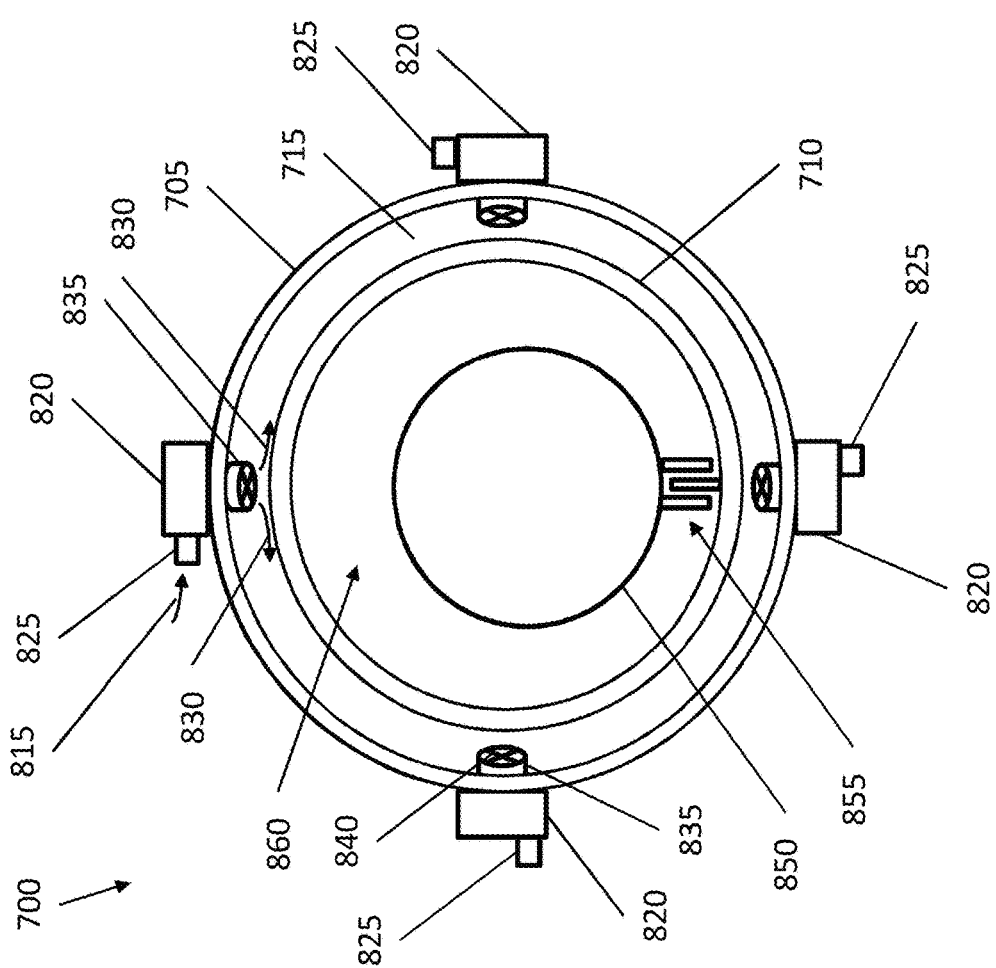
FIG. 8 shows an exemplary and non-limiting schematic depiction of a corrosion-resistant fluid membrane system in accordance with aspects of the disclosure.

FIG. 8 shows an exemplary and non-limiting schematic sectional view depiction of a corrosion-resistant fluid membrane system 700 in accordance with aspects of the disclosure. As shown in FIG. 8, the corrosion-resistant fluid membrane system 700 includes a corrosion-resistant fluid membrane 705. As shown in FIG. 8, the corrosion-resistant fluid membrane system 700 may be employed upon (and/or around) a hollow tubular structure 710. As shown in FIG. 8, the corrosion-resistant fluid membrane may substantially surround, for example, a metallic hollow tubular structure 710. It should be understood that the schematic depiction of FIG. 8 is not to scale, and the respective thicknesses of the hollow tubular structure 710 and the corrosion-resistant fluid membrane 705, for example, may have significantly different thicknesses (e.g., differences in order(s) of magnitude).

As shown in the exemplary and non-limiting schematic depiction of FIG. 8, the hollow tubular structure 710 is configured as a transportation tube, in which a vehicle (e.g., a pod or capsule) 850 is operable to move along through the transportation tube using a propulsion system 855 (e.g., linear synchronous motor). In embodiments, the interior 860 of the hollow tubular structure 710 may be configured and maintained as a low-pressure environment.

As shown in FIG. 8, the corrosion-resistant fluid membrane 705 may comprise a membrane or case (or cover) 705 and one or more pump assemblies 820 arranged, for example adjacent and/or on the membrane or case 705. In embodiments, the one or more pump assemblies 820 may be placed at fixed distances along the circumference and/or length of the metallic surface of the object. The pump assemblies 820 may include one or more pumps (not shown), and are configured to draw in seawater 815 through one or more inlets 825 into one or more fluid (e.g., seawater) treatment systems (not shown). In embodiments, the fluid treatment systems may include, for example, one or more reverse osmosis modules operable to desalinate the seawater (or reduce the salt content of the fluid to some extent). In further embodiments, the fluid treatment systems may utilize one or more reverse osmosis modules to increase the salt content of the fluid to some extent (e.g., for example when creating an environment conducive to growing a protective layer). In embodiments, the one or more water treatment systems may alternatively or further include one or more deoxygenating systems operable to remove oxygen from the fluid (e.g., seawater), so as to reduce the oxygen content of the fluid. In yet further embodiments, the one or more water treatment systems may alternatively or further include one or more pH adjustment systems operable to adjust (e.g., raise) the pH of the incoming seawater, so as to increase the basicity of the incoming fluid (e.g., seawater or fresh water). In embodiments, the water treatment systems may comprise one or more water treatment modules, wherein the one or more modules may comprise one or more reverse osmosis modules, one or more deoxygenating modules, and one or more pH adjusting modules. In embodiments, these may include separate water treatment systems, and in other embodiments, these may include combined fluid treatment systems. The one or more pumps may then transport the treated seawater 830 (e.g., desalinated, deoxygenated, and/or pH-adjusted seawater) through a pump assembly outlet 835 and into the channel 715 formed between the case 705 and the metallic surface of the object (e.g., the hollow tubular structure 710). The treated seawater 830 (e.g., desalinated and/or deoxygenated seawater) may enter the channel 715 through a unidirectional valve 840 located on each of the one or more outlets 835. The outlets 835 may include direction-controllable outlets (e.g., directional vanes, servo-controlled output tubes), operable to impart and/or adjust an output direction of the fluid flow of the treated seawater 830.

In some embodiments, the one or more pump assemblies 820 may be configured to activate simultaneously, thereby allowing the treated fluid (e.g., desalinated and/or deoxygenated seawater) to flow through the channel in substantially the same direction (e.g., from one longitudinal end of the tube structure to the opposite longitudinal end of the tube structure). In other embodiments, the one or more pump assemblies 820 may be configured to activate non-simultaneously (e.g., in a repeating synchronicity), thereby imparting a variable and/or circumferentially directed flow through the channel (e.g., from one longitudinal end of the tube structure to the opposite longitudinal end of the tube structure). While the exemplary depicted embodiment includes pump assemblies at one end of the tube, other contemplated embodiments may have pump assemblies at both longitudinal ends of the tube, for example, providing counter directed flows through, for example, adjacent channels.

Figure 9:
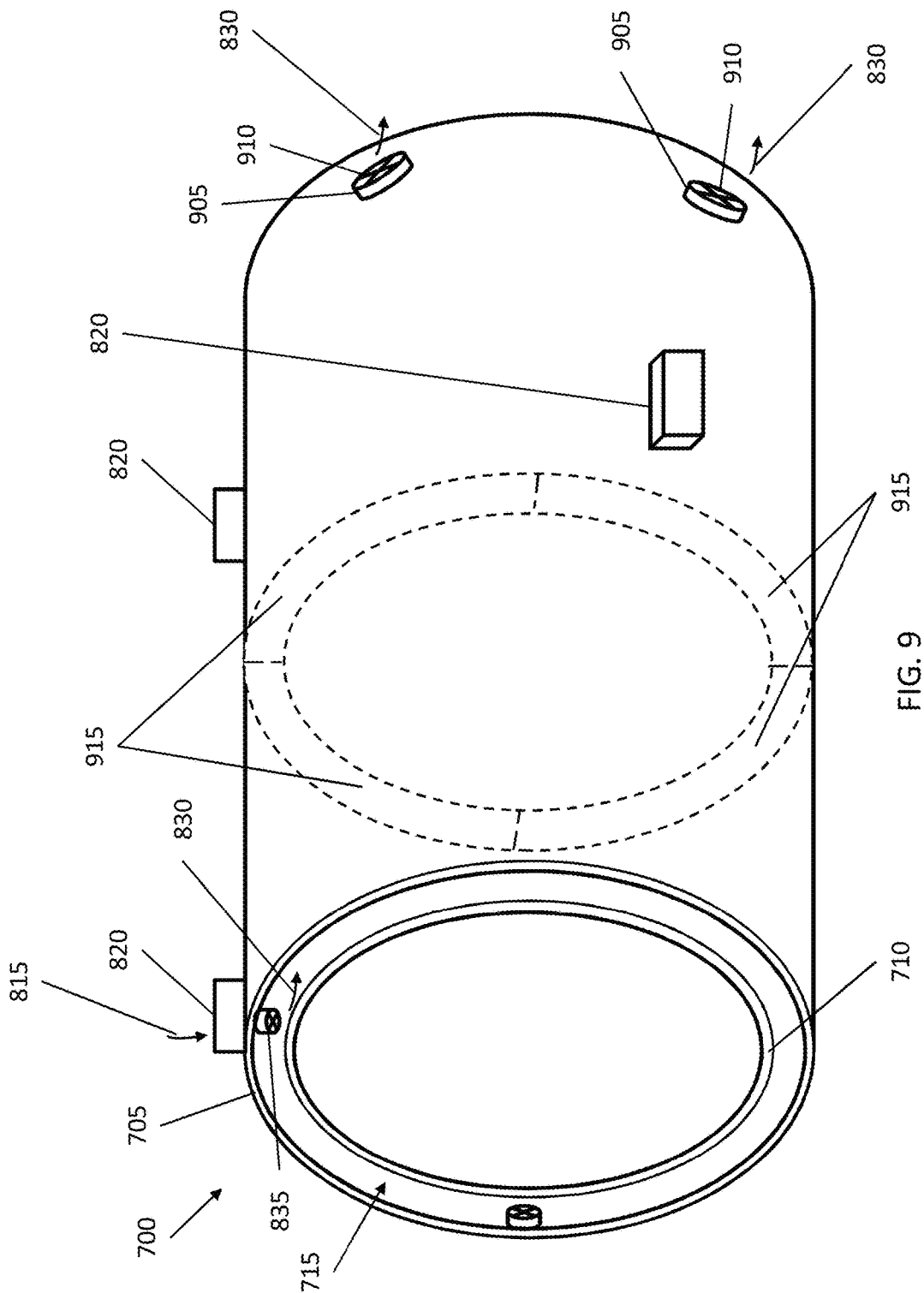
FIG. 9 shows an exemplary and non-limiting schematic depiction of a corrosion-resistant fluid membrane system in accordance with aspects of the disclosure.

FIG. 9 shows an exemplary and non-limiting schematic depiction of a corrosion-resistant fluid membrane system 700 in accordance with aspects of the disclosure. As shown in FIG. 9, the corrosion-resistant fluid membrane system 700 may comprise a case (or membrane) 705 and one or more pump assemblies 820. In embodiments, the one or more pump assemblies 820 may be placed at fixed distances along the circumference and/or length of the metallic surface of the object. The pump assemblies 820 may include one or more pumps (not shown), and are configured to draw in seawater 815 through one or more inlets (not shown) into one or more water treatment systems (not shown). The one or more pumps may then transport the treated seawater 830 (e.g., desalinated, deoxygenated, and/or pH-adjusted seawater) through a pump assembly outlet 835 and into the channel 715 formed between the case 705 and the metallic surface of the object (e.g., the hollow tubular structure 710).

As shown in FIG. 9, in accordance with aspects of the disclosure, the case 705 may further comprise one or more outlets 905, wherein each of the one or more outlets 905 may be fitted with a unidirectional valve 910. As the flow of the treated fluid 830 reaches the end of the channel 715 it exits through the one or more outlets 905. The unidirectional valve 910 prevents any flow backflow from the ambient environment into the channel 715. Additionally, as schematically depicted in FIG. 9, in accordance with aspects of the disclosure, the case 705 may further comprise one or more baffles 915 (e.g., one-way valve or seal) arranged within the channel 715 and configured to automatically and/or selectively open (e.g., passively and/or actively) and close the channel 715 or portions thereof (e.g., with an upstream fluid pressure above or below a threshold), to prevent or reduce any backwards flow of the treated fluid 830 (e.g., desalinated and/or deoxygenated seawater) through the channel 715.

Figure 10A:
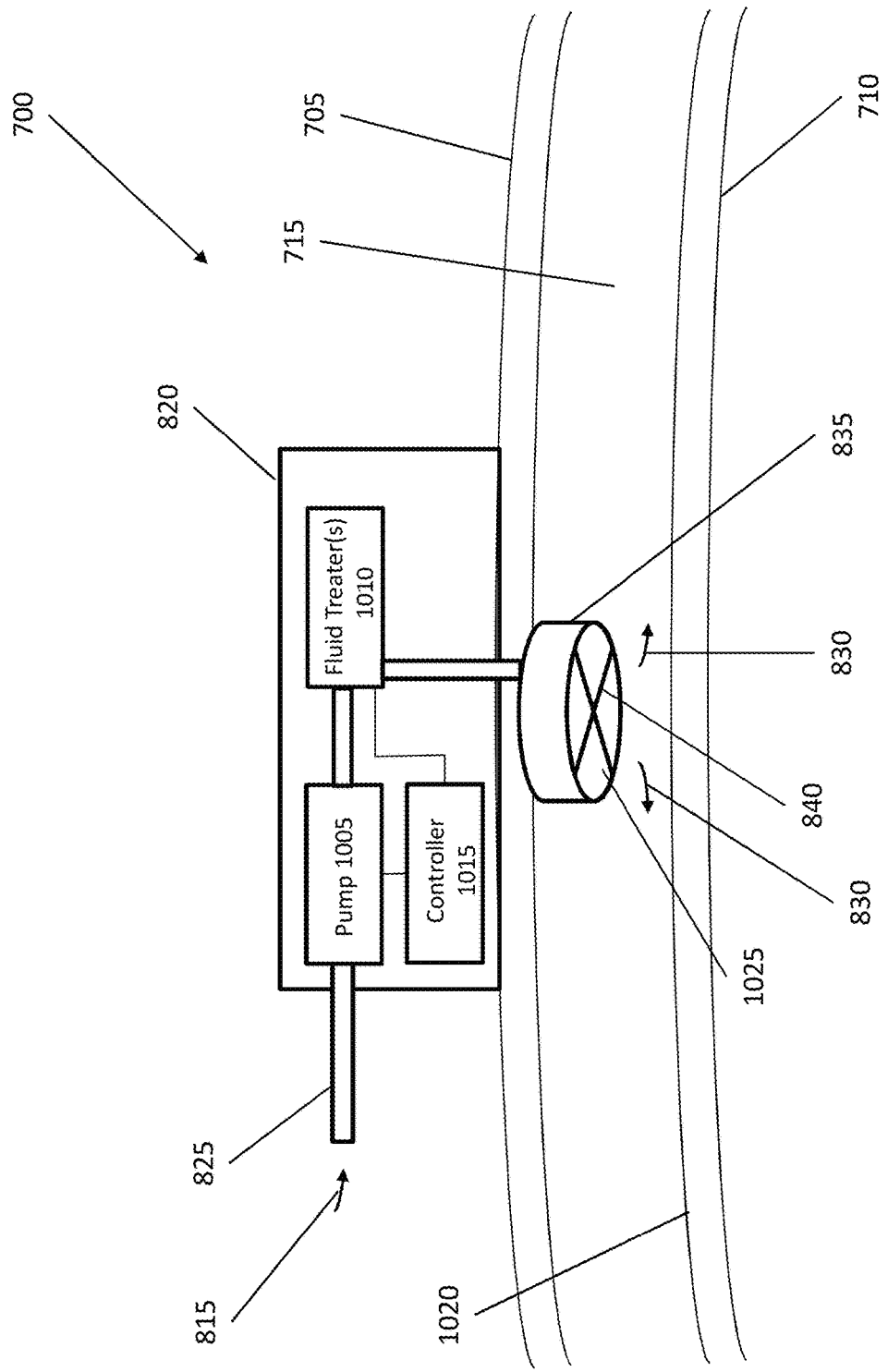
FIGS. 10A-10C schematically depict aspects of exemplary and non-limiting pump assemblies of a corrosion-resistant fluid membrane system 700 in accordance with aspects of the disclosure.

FIG. 10A schematically depicts aspects of an exemplary and non-limiting pump assembly 820 of a corrosion-resistant fluid membrane system 700 in accordance with aspects of the disclosure. As shown in FIG. 10A, the exemplary pump assembly 820 may include one or more pumps 1005. In various embodiments, the one or more pumps 1005 in the one or more pump assemblies 820 may comprise any combination of the following types of pumps: a reverse osmosis pump; a turbine pump; a piston pump; an electromagnetic pump; a piezoelectric pump; a water driven mechanical pump; a high-pressure pump, a multistage centrifugal pump; and/or a heat pump.

In accordance with aspects of the disclosure, the one or more pumps 1005 are configured to draw in seawater 815 through one or more inlets 825 into one or more fluid treatment systems or fluid treaters 1010. In embodiments, the fluid treaters 1010 may comprise one or more reverse osmosis modules operable to desalinate the seawater (or reduce the salt content to some extent). In certain embodiments, the low-pressure environment vacuum system (i.e., used to provide the low-pressure environment with the transportation tube) may be further utilized to create a high trans-membrane pressure (TMP) for the reverse osmosis process, in order to, for example, improve the efficiency and/or rate of the reverse osmosis process.

In embodiments, the one or more fluid treatment systems 1010 may alternatively or further include one or more deoxygenating systems operable to remove oxygen from the seawater, so as to reduce the oxygen content of the seawater. In yet further embodiments, the one or more fluid treatment systems 1010 may alternatively or further include one or more pH adjustment systems operable to raise the pH of the incoming seawater, so as to increase the basicity of the incoming seawater (or fresh water).

The one or more pumps 1005 may then transport the treated seawater 830 (e.g., desalinated, deoxygenated, and/or pH-adjusted seawater) through a pump assembly outlet 835 and into the channel 715 formed between the case 705 and the metallic surface 1020 of the object (e.g., the hollow tubular structure 710). The treated seawater 830 (e.g., desalinated and/or deoxygenated seawater) may enter the channel 715 through a unidirectional valve 840 located on each of the one or more outlets 835. In embodiments, the outlets 835 may include direction-controllable outlets (e.g., servo-controlled individual flaps 1025 of the unidirectional valve 840) operable to impart and/or adjust an output direction of the fluid flow of the treated seawater 830.

While not shown in the exemplary and non-limiting schematic depiction of FIG. 10A, in embodiments, the pump assembly may also include one or more of check valves, flow meters, regulators, and other conventional components of a fluid processing and delivery system.

Figure 10B:
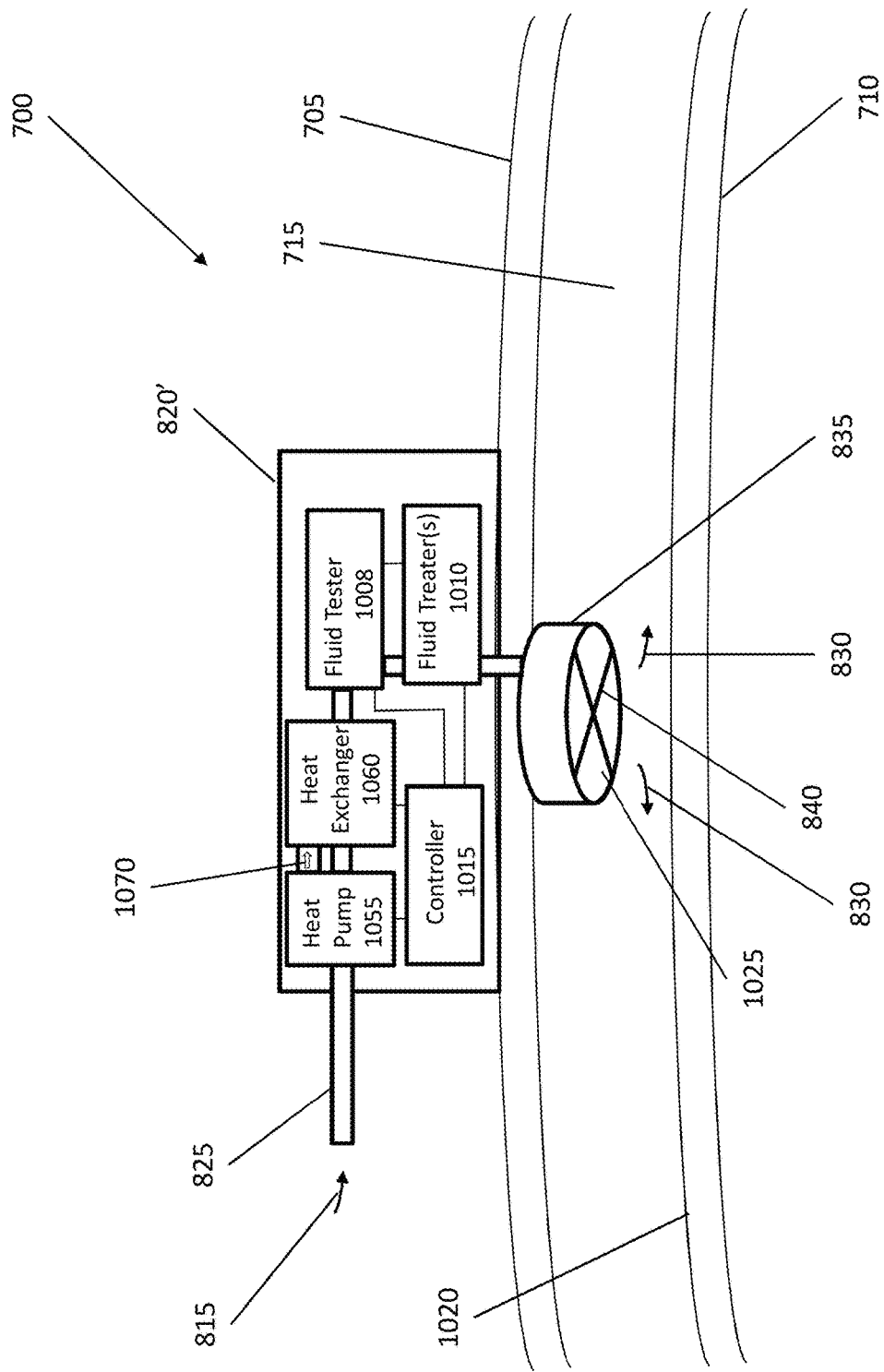

FIG. 10B schematically depicts aspects of a further exemplary and non-limiting pump assembly 820' of a corrosion-resistant fluid membrane system 700 in accordance with aspects of the disclosure. As discussed above, in certain embodiments, at least one of the one or more pump assemblies 820' may comprise a heat pump 1055, for example, as shown in FIG. 10B. In this exemplary and non-limiting embodiment, the pump assembly 820' further comprises a heat exchanger 1060. The one or more heat pumps 1055 are configured to draw in seawater 815 through one or more inlets 825 into one or more fluid treatment systems or fluid treaters 1010, and then transport the treated seawater 830 (e.g., desalinated, deoxygenated, and/or pH-adjusted seawater) through a pump assembly outlet 835 and into the channel 715 formed between the case 705 and the metallic surface 1020 of the object (e.g., the hollow tubular structure 710).

In accordance with further aspects of the disclosure, the heat pump 1055 may be configured to capture thermal energy 1070, which the heat exchanger 1060 then delivers to the treated fluid 830 (or yet to be treated fluid 815, depending on the order of the elements of the pump assembly 820'). Thus, upon exiting the pump assembly output 835, the treated fluid 830 includes added thermal energy from the heat pump 1055 via the heat exchanger 1060. In accordance with further aspects of the disclosure, the treated fluid 830 with added thermal energy may be output from the pump assembly 820' and input (or injected) into a particular region of the channel 715 (e.g., a lower portion) to thereby create a convection cell within the channel (see, e.g., FIG. 11). In further embodiments, the treated fluid 830 with added thermal energy may be output from the pump assembly 820' and input (or injected) into the channel 715 to provide an environment having properties that are more conducive to and/or promote the growth of protective layers (for example, as discussed below).

In accordance with further aspects of the disclosure, in certain embodiments, as shown in FIG. 10B, the pump assembly 820 may additionally comprise one or more fluid testers 1008. The one or more fluid testers 1008 are operable to assess and/or quantify one or more properties of the incoming fluid (e.g., ambient seawater), including, for example, salt concentration, pH value, oxygen concentration of the incoming seawater. In accordance with aspects of the disclosure, by assessing and/or quantifying one or more properties of the incoming fluid via the one or more fluid testers 1008, and forwarding this information to the one or more fluid treaters 1010, the one or more fluid treaters 1010 may, for example, more efficiently and/or more effectively treat the incoming fluid, as necessary, and, for example, in real-time, to achieve a treated fluid having certain desired properties (e.g., of salt concentration, oxygen concentration, and/or pH value) for reducing corrosion of the metal tube.

Figure 10C:
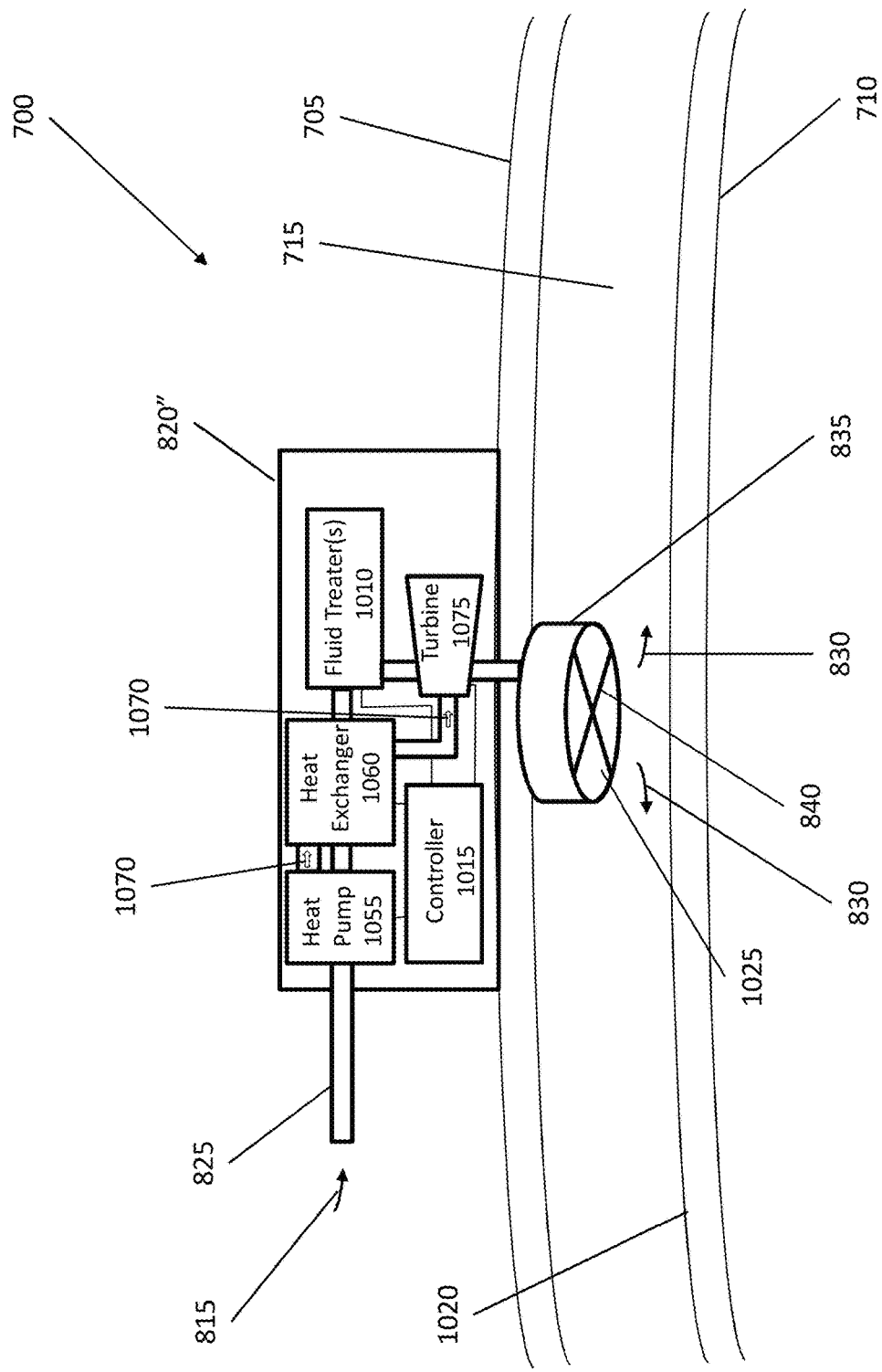

FIG. 10C schematically depicts aspects of a further exemplary and non-limiting pump assembly 820" of a corrosion-resistant fluid membrane system 700 in accordance with aspects of the disclosure. In this exemplary and non-limiting embodiment, the pump assembly 820" comprises a heat pump 1055 and heat exchanger 1060. The one or more heat pumps 1055 are configured to draw in seawater 815 through one or more inlets 825 into one or more fluid treatment systems or fluid treaters 1010, and then transport the treated seawater 830 (e.g., desalinated, deoxygenated, and/or pH-adjusted seawater) through a pump assembly outlet 835 and into the channel 715 formed between the case 705 and the metallic surface 1020 of the object (e.g., the hollow tubular structure 710).

As shown in the schematic depiction of FIG. 10C, the pump assembly 820" further comprises one or more turbines 1075. In accordance with further aspects of the disclosure, the heat exchanger 1055 then delivers the captured thermal energy 1070 to the one or more turbines 1075 to drive the turbines 1075. In accordance with aspects of the disclosure, the one or more turbines 1075 are operable to drive the treated fluid 830 (e.g., desalinated and/or deoxygenated seawater) forward through the channel 715 of the system 700.

Figure 11:
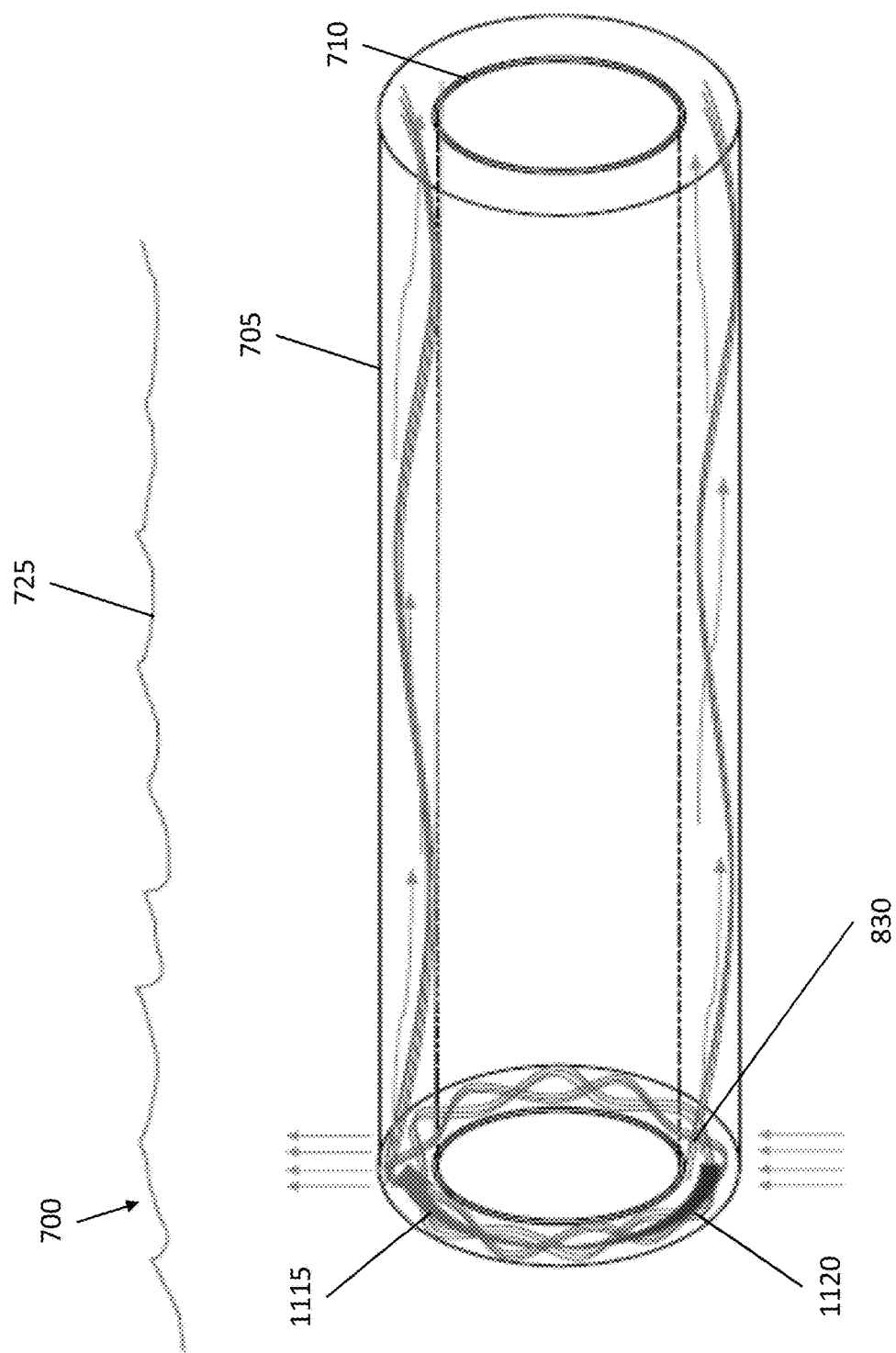
FIG. 11 shows further aspects of an exemplary and non-limiting corrosion-resistant fluid membrane system in accordance with aspects of the disclosure.

FIG. 11 schematically illustrates a treated fluid 830 with added thermal energy that is injected into a particular region of the channel 715 (e.g., a lower portion) to thereby create a convection cell within the channel 715, in accordance with aspects of the disclosure. As discussed, for example with reference to FIG. 10B, a heat pump 1055 may be configured to capture thermal energy, which a heat exchanger then delivers to the treated fluid 830. Thus, upon exiting the pump assembly output, the treated fluid 830 includes added thermal energy from the heat pump via the heat exchanger.

As shown in the exemplary depiction of FIG. 11, when treated fluid 830 with added thermal energy is injected into the channel 715, a convection cell is formed between the relatively higher-temperature bottom-region thermal currents 1120 and the relatively lower-temperature upper-region thermal currents 1115. In accordance with aspects of the disclosure, utilizing the convective flow may provide for or supplement a circulation rate of fluid through the channel 715, and/or may induce or enhance mixing and/or homogeneity of the treated fluid.

In yet another embodiment, a corrosion inhibiting solution may be introduced to the treated fluid 830 (e.g., the desalinated and/or deoxygenated seawater). In accordance with aspects of the disclosure, the corrosion inhibiting solution may combat the corrosive properties of salt, oxygen, or anaerobic bacteria still present in the treated fluid 830 (e.g., desalinated and/or deoxygenated seawater). Corrosion inhibitors are additives to the fluids that surround the metal or related object. A corrosion inhibitor is a chemical compound that, when added to a liquid or gas, decreases the corrosion rate of a material, typically a metal or an alloy. The effectiveness of a corrosion inhibitor may depend on fluid composition, quantity of water, and/or flow regime. A common mechanism for inhibiting corrosion involves formation of a coating, often a passivation layer, which prevents access of the corrosive substance to the metal. In embodiments, the corrosion inhibiting solution may include chemicals that form an electrically insulating or chemically impermeable coating on exposed metal surfaces, to suppress electrochemical reactions. Such methods make the system less sensitive to scratches or defects in the coating, since extra inhibitors can be made available wherever metal becomes exposed. Chemicals that inhibit corrosion may include, for example, chromates, phosphates, polyaniline, other conducting polymers and/or a wide range of specially-designed chemicals that resemble surfactants (e.g., long-chain organic molecules with ionic end groups).

In other embodiments, a corrosion inhibiting solution may include bacteria, and may provide for applying one or more bacterial films to the surface of metals in corrosive environments, which may increase the corrosion resistance of the metal tube substantially. Additionally, antimicrobial-producing biofilms can be used to inhibit mild steel corrosion from, for example, sulfate-reducing bacteria.

Figure 12:
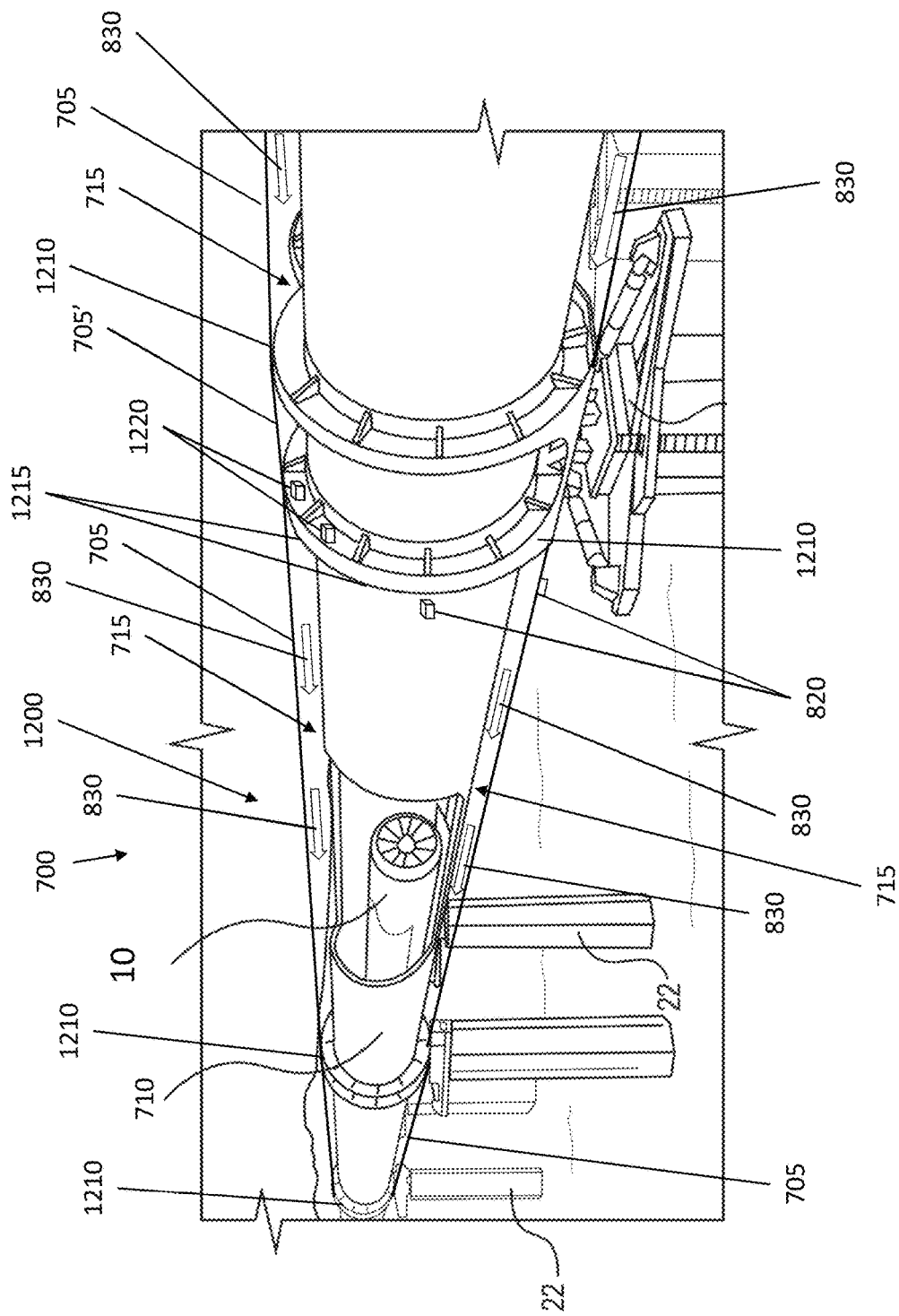
FIG. 12 shows an exemplary and non-limiting depiction of a transportation system having an exemplary and non-limiting corrosion-resistant fluid membrane system in accordance with aspects of the disclosure.

FIG. 12 shows an exemplary and non-limiting depiction of a transportation system having an exemplary and non-limiting corrosion-resistant fluid membrane system 700 in accordance with aspects of the disclosure. As shown in FIG. 12, in one exemplary and non-limiting embodiment of the present disclosure, a capsule 10 is traveling through the tube 710 of a transportation system, which is supported in an underwater environment 1200 (e.g., in an undersea environment) by a series of supports (e.g., pillars 22) spaced apart along a path of travel. That is, in contrast to an SFT, for example discussed herein, the exemplary and non-limiting embodiment of FIG. 12 includes at least a portion of tube that may be, for example, more rigidly supported in an underwater environment 1200 by pillars 22.

As shown in FIG. 12, the corrosion-resistant fluid membrane system 700 includes a corrosion-resistant fluid membrane 705 that is impermeable (or substantially impermeable) to fluids, e.g., seawater. As shown in FIG. 12, in embodiments, the corrosion-resistant fluid membrane system 700 may be employed upon (and/or around) a hollow tubular structure 710. As shown in FIG. 12, the corrosion-resistant fluid membrane may substantially surround, for example, a metallic hollow tubular structure 710.

The schematic depiction of FIG. 12 illustrates a few sections of tube (e.g., tubular structure 710) utilizing one or more corrosion-resistant fluid membranes 705 arranged serially along the path of the transportation tube. In embodiments, these serially-arranged corrosion-resistant fluid membranes 705 of the corrosion-resistant fluid membrane system 700 may be discrete or may share and/or jointly utilize shared components.

As shown in FIG. 12, in embodiments, the metallic hollow tubular structure 710 may be submerged (e.g., partially or completely) in an underwater environment 1200 (e.g., seawater or freshwater), thereby potentially exposing the metallic hollow tubular structure 710 (if unprotected) to corrosion. As shown in FIG. 12, in accordance with aspects of the disclosure, the exemplary and non-limiting corrosion-resistant fluid membrane 705 prevents contact between the metallic hollow tubular structure 710 and the seawater and provides a channel 715 for flow of a fluid 830 in a direction around the metallic hollow tubular structure 710 between an inner surface of the membrane 705 and an outer surface of the tubular structure 710. In accordance with aspects of the disclosure, the treated fluid 830 is flowed through the channel 715 to provide corrosion resistance to the tubular structure 710. As shown in the exemplary embodiment of FIG. 12, with this arrangement, the flow of the fluid 830 is in a direction opposite to the travel direction of the capsule in the transportation tube. In other contemplated embodiments, the flow of the fluid 830 may be in a same direction as the travel direction of the capsule in the transportation tube.

With the exemplary depiction of FIG. 12, the corrosion-resistant fluid membrane 705 is illustrated as transparent to more clearly depict aspects of the disclosure. In contemplated embodiments, the corrosion-resistant fluid membrane 705 may be transparent, translucent, or opaque. In accordance with aspects of the disclosure, a transparent membrane 705 may allow visible detection of any effects of corrosion on the tubular structure 710.

As shown in the exemplary depiction of FIG. 12, in some embodiments the membranes 705 may connect between or adjacent respective tube support structures (e.g., structural reinforcement rings 1210) using one or more attachment structures 1215. In embodiments, the one or more attachment structures 1215 may include, for example, tension clamps, rivets, and/or adhesives, amongst other contemplated attachment structures. As additionally shown in FIG. 12, between adjacent reinforcement rings 1210 at the pillar(s) 22, in some exemplary embodiments, the corrosion-resistant fluid membrane system 700 may include, for example, a smaller corrosion-resistant fluid membrane 705' having a different configuration attached between the adjacent reinforcement rings 1210. In further contemplated embodiments, the region between adjacent reinforcement rings 1210 at the pillar(s) 22 may remain uncovered by a corrosion-resistant fluid membrane.

In embodiments, as shown in FIG. 12, the pump assemblies 820 may be arranged on or adjacent an exterior region of the corrosion-resistant fluid membrane 705. In further contemplated embodiments, pump assemblies 1220 may be arranged on or adjacent reinforcement rings 1210 (e.g., in communication with the channels 715 via passageways provided through the reinforcement rings 1210). For example, in embodiments, as shown in the non-limiting depiction of FIG. 12, the pump assemblies 1220 may be on or adjacent reinforcement rings 1210 in the region between adjacent reinforcement rings 1210 at the pillar(s) 22 (which region, for example, in embodiments, may remain in communication with ambient seawater).

While the exemplary embodiments of the present disclosure have been shown with tubular shapes, the disclosure contemplates the case or membrane in other configurations. For example, embodiments of the present disclosure may utilize structures described in commonly-assigned application Ser. No. 15/008,017, titled "Low-Pressure Environment Structures," the contents of which are hereby expressly incorporated by reference herein in their entirety.

Figure 13A:
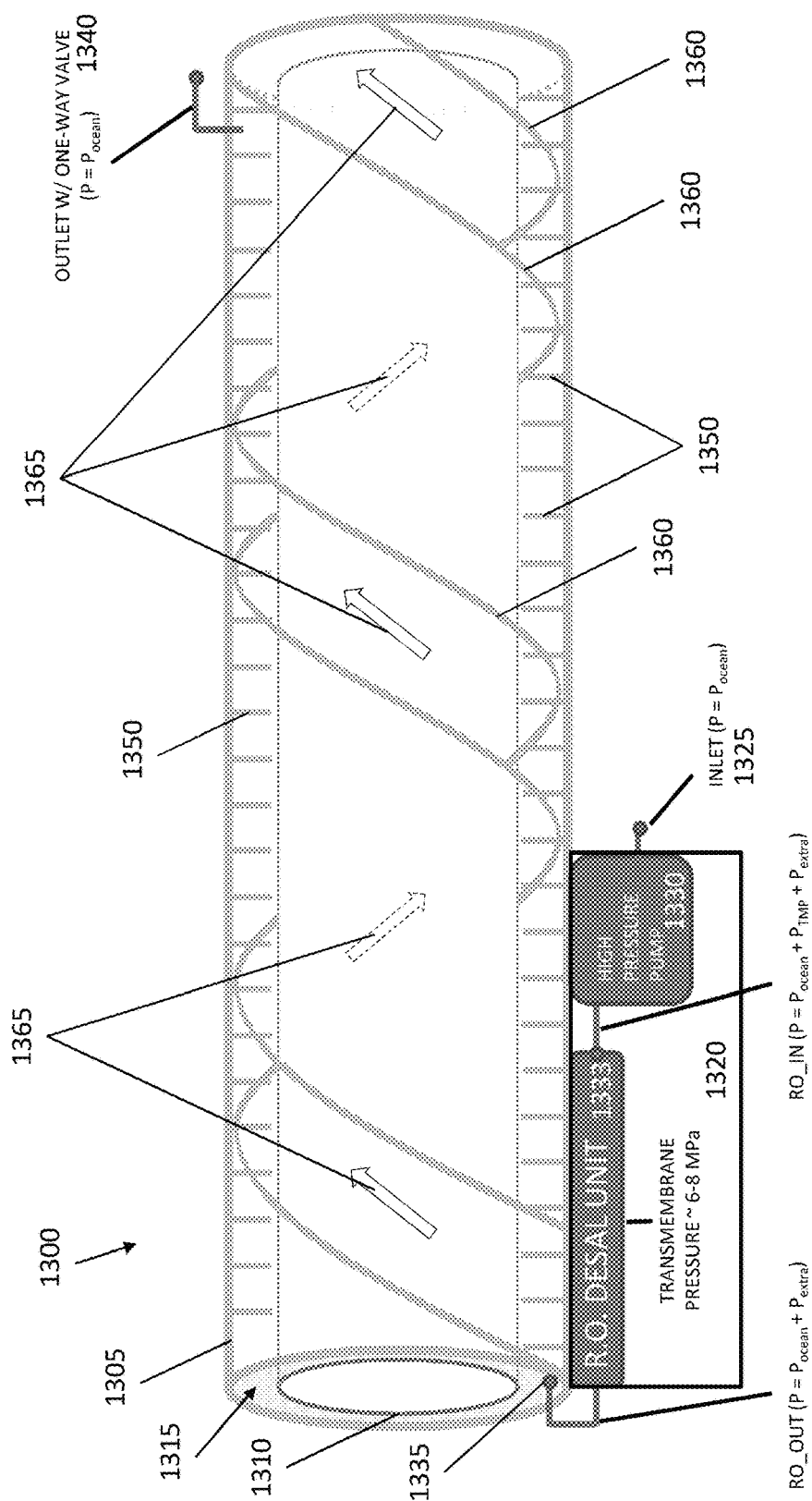

FIGS. 13A and 13B show exemplary and non-limiting embodiments of a corrosion-resistant fluid membrane system 1300 having a composite tube structure in accordance with aspects of the disclosure. As shown in FIG. 13A, with an exemplary and non-limiting embodiment, the corrosion-resistant fluid membrane system 1300 may comprise a case 1305 and one or more pump assemblies 1320. In embodiments, the case (or membrane) 1305 may comprise, for example, an inexpensive, flexible, corrosion-resistant shell (e.g., a high-density polyethylene membrane). As shown in FIG. 13A, with the exemplary and non-limiting embodiment, the pump assembly 1320 includes a high-pressure pump 1330, and is configured to draw in seawater through one or more inlets 1325 into one or more water treatment systems (for example, including a desalination reverse osmosis unit 1333). The high-pressure pump 1330 is operable to transport the treated seawater (e.g., desalinated seawater) through a pump assembly outlet 1335 and into the channel 1315 formed between the case 1305 and the metallic surface of the object (e.g., the hollow tubular structure 1310).

As shown in the exemplary and non-limiting embodiment of FIG. 13A, a plurality of molded studs 1350 may be structured and arranged within the channel 1315 to maintain a gap between inner tube 1310 and corrosion-resistant shell 1305. As schematically illustrated, in some embodiments, fins (e.g., molded helical fins 1360) may be structured and arranged within the channel 1315 (e.g., depending from an interior surface of the shell 1305) to promote circumferential flow 1365 (or a circumferential component of flow) to the treated fluid.

As shown in FIG. 13A, with an exemplary and non-limiting embodiment, osmotic pressure (seawater, 32 grams/liter): is approximately 339 PSI or 23 ATM or 2.3 MPA. As shown in FIG. 13A, the pressure at the inlet 1325 or inlet pressure INLET (P=$P_{ocean}$). With the exemplary embodiment, a pressure at the inlet to the reverse osmosis unit 1333 may be RO_IN (P=$P_{ocean}$+$P_{TMP}$+$P_{extra}$), and a pressure at the outlet to the reverse osmosis unit 1333 may be RO_OUT (P=$P_{ocean}$+$P_{extra}$), with a transmembrane pressure of, for example, ~6-8 MPa. A pressure at the outlet 1340 (with a one-way valve) or outlet pressure OUTLET (P=$P_{ocean}$).

As shown in the exemplary and non-limiting embodiment of FIG. 13B, the corrosion-resistant fluid membrane system 1300 comprises a case (or membrane) 1305 and one or more pump assemblies 1320. As shown in FIG. 13B, with the exemplary and non-limiting embodiment, the pump assembly 1320 includes a high-pressure pump 1330, and a water treatment system including a desalination reverse osmosis desalination unit 1333. The high-pressure pump 1330 is operable to transport the treated seawater (e.g., desalinated seawater) through a pump assembly outlet 1335 and into the channel 1315 formed between the case 1305 and the metallic surface of the object (e.g., the hollow tubular structure 1310).

As shown in FIG. 13B, in certain exemplary embodiments, support braces 1375 connected between the case 1305 and elements of the pump assembly 1320 may be utilized to support the pump assembly 1320. As also shown in FIG. 13B, molded studs 1370 (which, for example do not traverse the entire width of the channel 1315) may optionally be provided within the channel 1315, for example, to induce mixing and/or homogeneity of the treated fluid.

FIGS. 14A and 14B show an exemplary and non-limiting composite tube structure 1400 in accordance with aspects of the disclosure. As shown in FIGS. 14A and 14B, the disclosure contemplates that, in embodiments, the tube structure 1400 may include a metal tube 1410 and the outer shell 1405 (e.g., a corrosion resistant cover, or membrane, for example, HDPE), with an intermediate layer 1415 arranged between the metal tube 1410 and the outer shell 1405. In embodiments, the outer shell 1405 may be optimized for the ambient environmental conditions (e.g., to reduce wear from weather and/or corrosion). Additionally, for example, in embodiments, the outer shell 1405 may be optimized to be resistant to puncture from, for example, gun shots.

As shown in FIGS. 14A and 14B, in contrast to the above-discussed embodiments, in which an open channel is provided and maintained between the metal tube 1410 and the outer shell 1405, with the exemplary embodiment of FIGS. 14A and 14B, the "channel" or void may be "filled" such that the intermediate layer 1415 is in contact with and surrounds the metal tube 1410. With one exemplary and non-limiting embodiment, the intermediate layer 1415 may comprise a layer formed by calcium accretion, or "biorock," which may fill the void (e.g., completely or partially) between the outer shell 1405 and metallic surface 1410. Accretions refer to the substance formed by electro-accumulation of minerals dissolved in seawater. The biorock building process grows cement-like structures, often in salt water. Accretion works by passing a small electric current through electrodes in the water. The accretion structure grows more or less without limit as long as current flows.

In accordance with aspects of the disclosure, applying a low voltage electric current (which is completely safe, for example, for swimmers and marine life) to a submerged conductive structure (e.g., the metal transportation tube 1410) causes dissolved minerals in seawater, (e.g., calcium, magnesium and/or bicarbonate) to precipitate and adhere to the metal transportation tube structure. The result is a composite 1415, e.g., of brucite hydromagnesite and limestone, with mechanical strength similar to concrete formed on the exterior of the transportation tube structure (or, in embodiments, between the transportation tube structure 1410 and the outer shell 1405).

As the accretion material is derived from seawater, this material is similar to the composition of natural coral reefs and tropical sand beaches. As the salt water electrolyzes, calcium carbonate (aragonite) combines with magnesium, chloride and hydroxyl ions to slowly form around the cathode, eventually coating the electrode (e.g., the metal transportation tube 1410) with a material similar in composition to complex magnesium oxychloride cements and as strong as concrete. Over time cathodic protection replaces the negative chloride (Cl−) ion with dissolved bicarbonate ($HCO_{3-}$) to harden the coating to a hydromagnesite-aragonite mixture with gaseous hydrogen being evolved through the porous structure. In embodiments, the accretion coatings can thicken at the rate of 5 cm per year. As long as current flows, the structure continues to get larger and stronger. An accretion structure can also "heal" itself if damaged, making it particularly useful as a replacement for concrete in hard-to-access locations.

Accretion structures can be built in any size or shape depending only on the physical makeup of the sea bottom, wave, current energies and/or construction materials. Accretion structures may be well suited for remote, third world sites, for example, where exotic building materials, construction equipment and highly skilled labor may be in short supply or non-existent.

Accretion structures may range in compressive strength from, for example, 3720 to 5350 $lbf/in^2$ (26 to 37 MPa)—for comparison, the concrete typically used in sidewalks has a lower strength of about 3500 $lbf/in^2$ (24 MPa). In embodiments, one of the main components of accretion structures is magnesium hydroxide, and another main component is calcium carbonate, which is chiefly the result of the ionic composition of seawater. In exemplary embodiments, one kilowatt hour of electricity will result in the accretion of about 0.4 to 1.5 kg (0.9 to 3.3 lb) of biorock, depending on various parameters such as depth, electric current, salinity, and/or water temperature.

Using accretion structures (or "biorock") is cost-effective, and the process utilizes metal bars or similar conductive structures to conduct electricity along the base (or foundation) structure (e.g., metal tube) and a small amount of electricity. In embodiments, biorock formation may utilize electricity provided from fossil fuels (which generates $CO_2$), but may also utilize solar power, wind power, tidal power, and/or wave power (which power sources do not produce $CO_2$). The resulting accretion material may be cheaper than concrete blocks in many places, depending, for example, on local electricity and/or cement transport costs.

In other contemplated embodiments, the void between the metal tube 1410 and the outer shell 1405 with a resin (e.g., a static epoxy resin).

In further contemplated embodiments, for example, growth acceleration of the calcium accretion layer (e.g., carbonate (aragonite) protective layer) and/or enhancement of structural properties the accretion layer may be tailored by controlling the environment around the tube or within the channel prior to accretion formation. For example, in embodiments, an outer shell may be used to provide a channel along the exterior of the metal tube, and an enhanced accretion layer is formed within the channel by controlling the environment (e.g. controlling one or more properties of the treated fluid) around the tube or within the channel prior to accretion formation and/or during accretion formation. In further embodiments, the outer shell may be utilized as a "temporary" covering that provides an environment conducive to accretion formation, e.g., while the accretion layer is being formed, but that may later be removed (or destroyed, e.g., by accretion formation) after a sufficient accretion layer has been formed around the tube.

In embodiments, for example, a mild electric current may be used to precipitate, e.g., calcium carbonate on a metal exterior of the structure, thus, once formed, intervening between the metal exterior of the tube and the seawater, thus preventing contact between the metal exterior and the sea water. In such a manner, the formed accretion layer is operable to provide a layer of corrosion protection to the metal exterior of the structure.

Figure 14C:
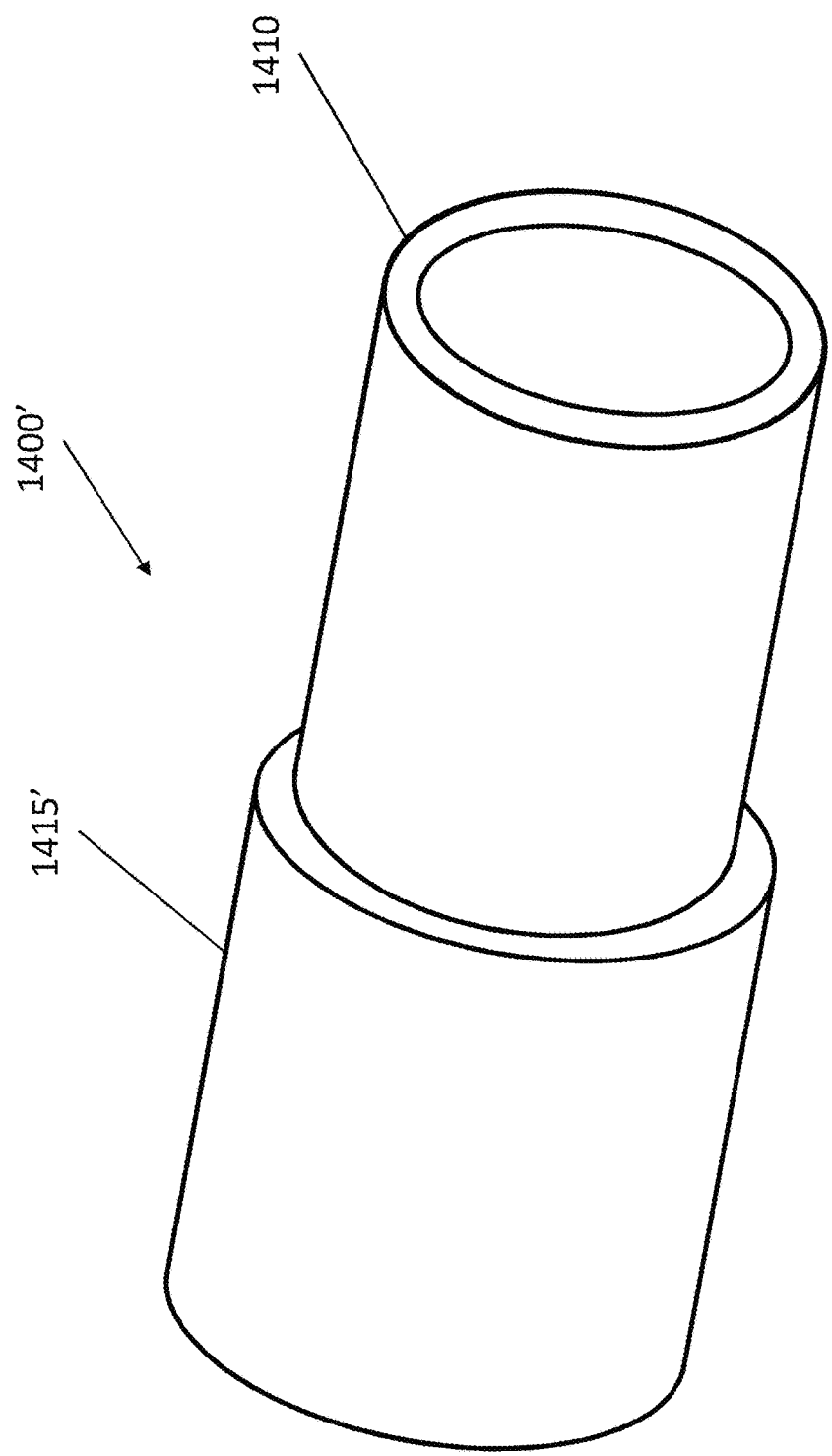

FIG. 14C shows an exemplary and non-limiting composite tube structure 1400' in accordance with further aspects of the disclosure. As shown in FIG. 14C, in embodiments, the tube structure 1400' may include a metal tube 1410 an outer layer 1415' arranged on the metal tube 1410 (for example, without a corresponding membrane or outer shell). With one exemplary and non-limiting embodiment, the outer layer 1415' may comprise a layer formed by calcium accretion, or "biorock", which may cover (e.g., completely or partially) the metallic surface of the metal tube 1410 so as to provide corrosion-resistance to the metal tube 1410.

In further embodiments, the system may utilize petrolatum-based tapes, e.g., a synthetic fiber-reinforced tape impregnated and coated with a specially formulated, petrolatum based compound containing inert fillers and water displacing agents. The tape provides a long-lasting anti-corrosion layer for steel and concrete surfaces, by displacing water, sealing out oxygen and forming a moisture resistance bond, for example, in a region not covered with an outer shell 1405 and/or to connect adjacent regions of outer shell 1405 to one another and/or to other structures. A tough outer cover (e.g., a HDPE, UV resistant material) may surround the tape to protect against weathering and mechanical damage. The outer cover may provide mechanical protection, for example, against the elements and/or accidental impact.

Embodiments of the present disclosure may also use, for example, stainless steel fasteners, e.g., 316 SS marine grade stainless steel bolts, nuts and washers, for example, to secure components of the corrosion-resistant fluid membrane system to one another and/or to the tubular structure. Other materials that may be used for the corrosion-resistant fluid membrane system include petrolatum tapes and coatings, polyurethanes, HDPE, Polyesters, Fiberglass, Polypropylenes, and PVC, amongst other contemplated materials.

System Environment

Aspects of embodiments of the present disclosure (e.g., control systems for one or more corrosion resistant fluid membrane systems 700) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet,
- a magnetic storage device,
- a usb key, and/or
- a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 15:
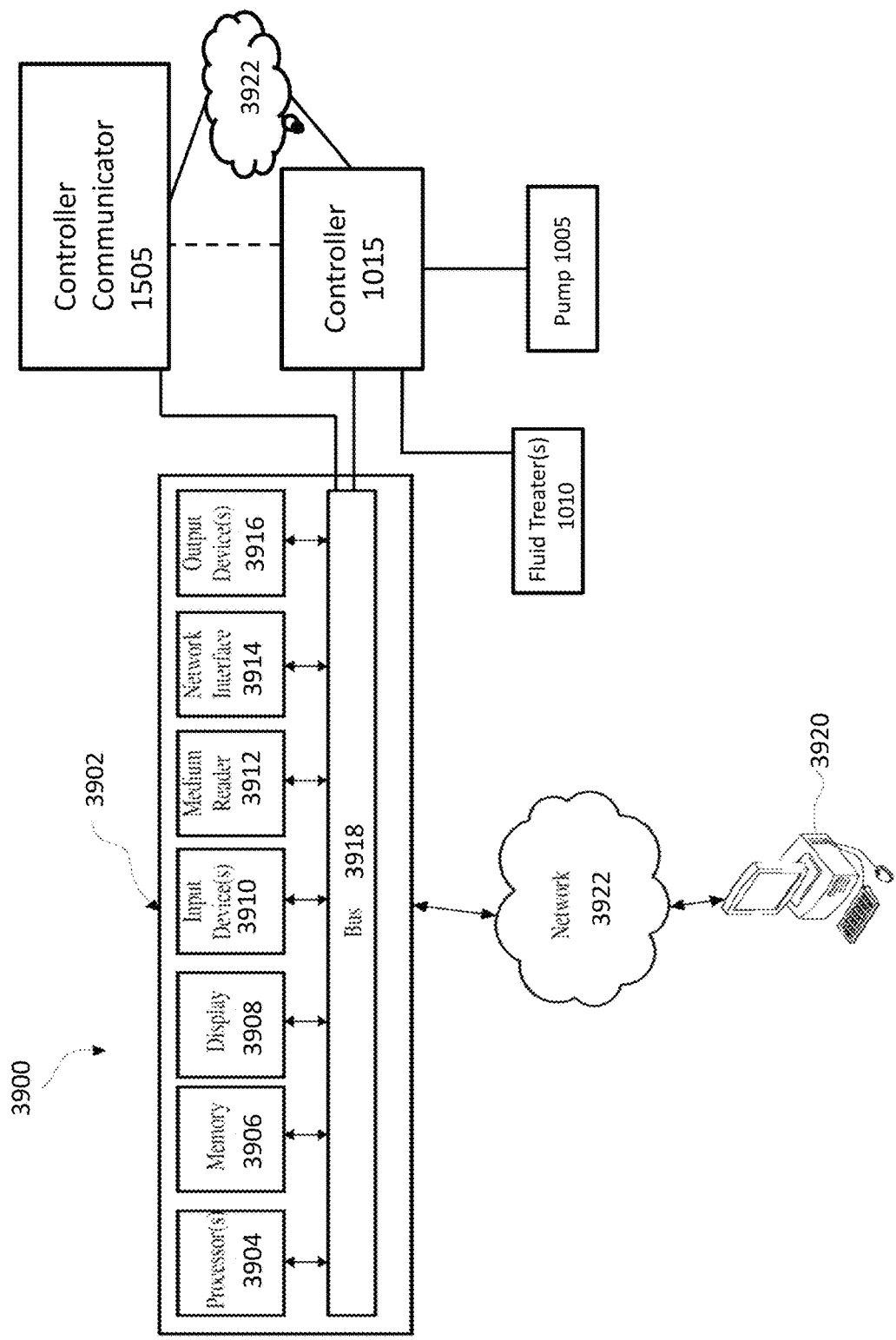
FIG. 15 shows an exemplary and non-limiting system environment in accordance with aspects of the disclosure.

FIG. 15 shows an exemplary system environment and control for a corrosion resistant fluid membrane system in accordance with the embodiments described herein in accordance with aspects of the disclosure. The system 3900 is generally shown and may include a computer system 3902, which is generally indicated. The computer system 3902 may operate as a standalone device or may be connected to other systems or peripheral devices (e.g., computer 3920). For example, the computer system 3902 may include, or be included within, any one or more computers, servers, systems, communication networks or cloud environment. As shown in FIG. 15, the system 3900 may be used to control one or more controllers 1015 and/or one or more controller communicators 1505, wherein the one or more controllers 1015 may be operable to control one or more pumps 1005 and/or one or more fluid treaters 1010 of, for example, individual pumping assemblies. In embodiments, the controller communicator 1505 may directly communicate with one or more controllers 1015 (e.g., remotely located along a transportation path), via, for example, WiFi, Bluetooth. In some embodiments, the controller communicator 1505 may directly communicate with one or more controllers 1015 via a network 3922.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 15, the computer system 3902 may include at least one processor 3904, such as, for example, a central processing unit, a graphics processing unit, or both. The computer system 3902 may also include a computer memory 3906 and a bus 3918. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 15, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 15. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

Flow Diagrams

Figure 16:
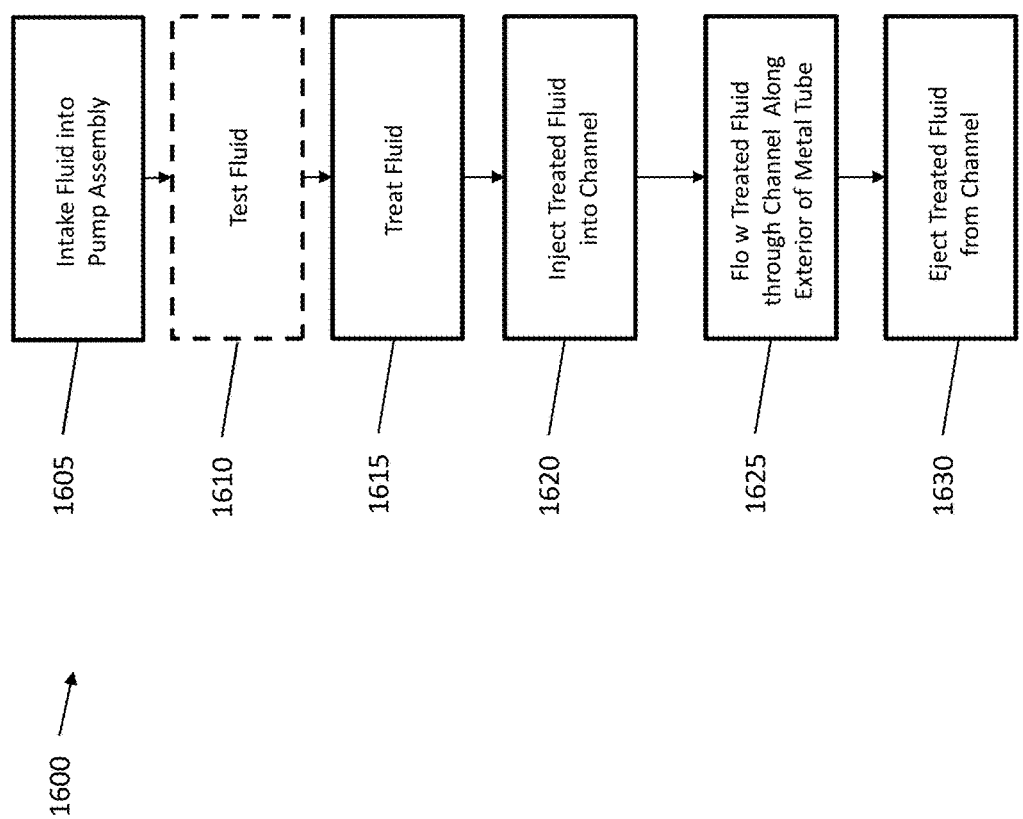
FIGS. 16 and 17 show exemplary and non-limiting flow diagrams for performing aspects of the present disclosure.
Figure 17:
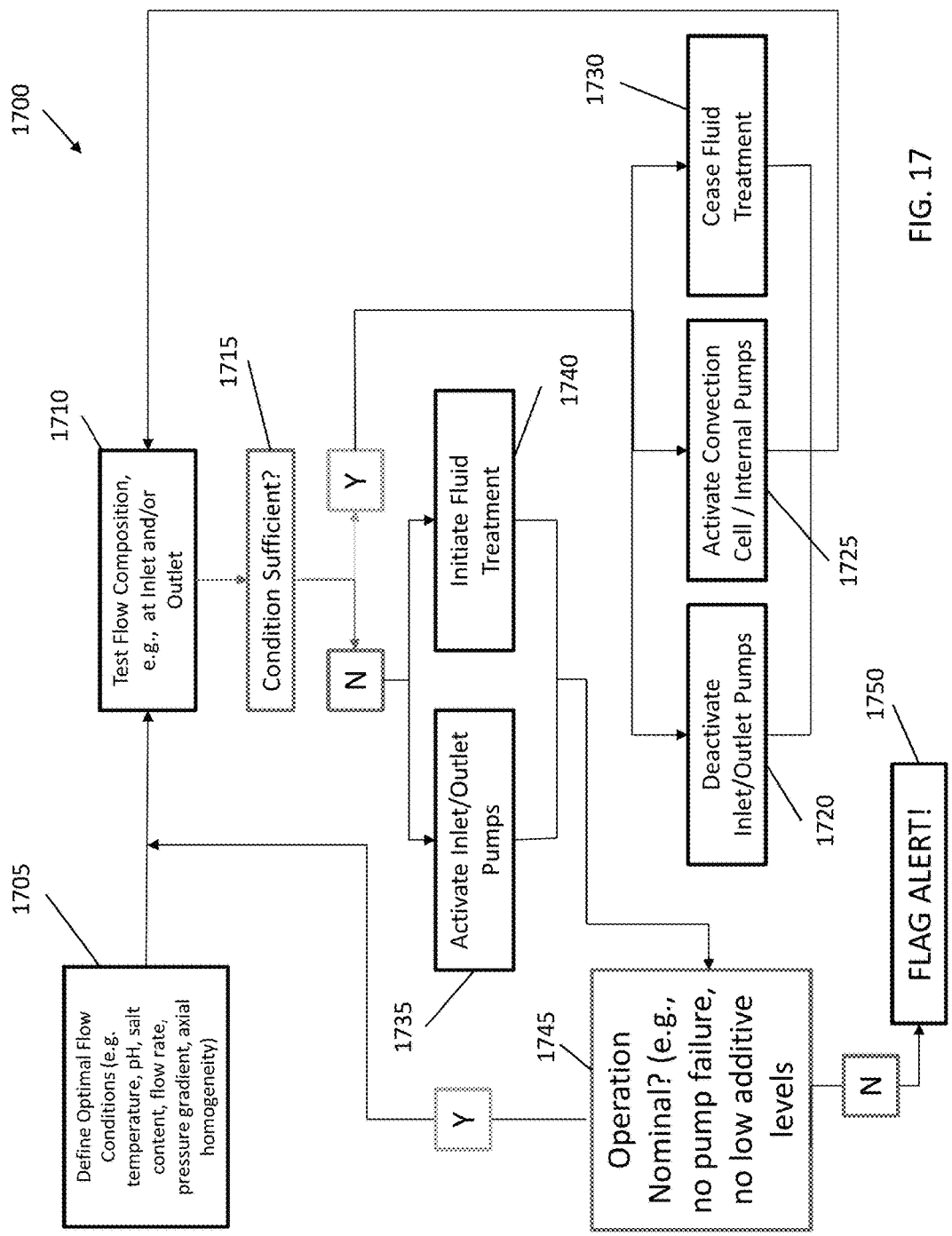

FIGS. 16 and 17 show exemplary flows for performing aspects of the present disclosure. The steps of FIGS. 16 and 17 may be implemented in the environment of FIG. 15, for example. The flow diagram may equally represent a high-level block diagram of embodiments of the disclosure. The flowchart and/or block diagrams of FIGS. 16 and 17 illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s), (and/or it may represent a piece of hardware). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, embodiments of the disclosure can take the form of a computer program product accessible from a computer-usable or computer-readable medium providing program code for use by or in connection with a computer or any instruction execution system. The software and/or computer program product can be implemented in the environment of FIG. 15. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 16 illustrates an exemplary flow 1600 for proving corrosion protection to a structure. At step 1605, a fluid (e.g., seawater) is inducted into a pump assembly (e.g., via an inlet using a pump). At optional step 1610 (indicated by the dashed border), properties of the fluid may be tested (e.g., determined and/or quantified) by one or more testing devices. Tested properties may include, for example, salt concentration, pH level, oxygen concentration, and the one or more testing devices may include a salt concentration measurer, pH level measurer, and/or an oxygen concentration measurer.

At step 1615, the fluid is treated by one or more fluid treatment devices, resulting in a treated fluid. In embodiments, the fluid treatment devices may include one or more of a desalination apparatus, a deoxidizer apparatus, a pH adjustment device, and/or a fluid additive device. At step 1620, the treated fluid is injected into the channel between the exterior of the metal tube and the cover (or membrane), for example, at one end of the channel. At step 1625, the treated fluid is flowed through the channel along the exterior of the metal tube, so as to provide corrosion resistance to the exterior of the metal tube. At step 1630, the treated fluid is ejected from the channel, for example, through one or more channel outlets.

FIG. 17 illustrates an exemplary flow 1700 for proving corrosion protection to a structure. In accordance with aspects of the disclosure, in some embodiments, the channel fluid may be pumped through the channel intermittently, for example, as necessary, determined by testing fluid currently in the channel. In such a manner, in accordance with aspects of the disclosure, energy consumption and wear may be reduced while providing sufficient protection to the structure. As shown in FIG. 17, at step 1705 flow conditions may be defined. Such conditions may include, for example, fluid temperature, fluid pH, fluid salt concentration, fluid flow rates, pressure gradients, and/or axial homogeneity. At step 1710, properties of the fluid (e.g., fluid temperature, fluid pH, fluid salt concentration, fluid flow rates) and/or flow conditions may be tested and measured, for example, at the inlet and/or at the outlet of the channel using one or more sensors (e.g., thermometers, pH measurers, salt concentration measures, flow meters). At step 1715, one or more of the measured properties and/or conditions are compared to the defined conditions. If, at step 1715, the measured properties/conditions are sufficient, with this exemplary embodiment, at step 1720, the inlet and/or outlet pumps may be deactivated, at step 1725, convection cell pumps (e.g., internal channel pumps) may be activated, and at step 1730, fluid treatment may be ceased. While these steps are shown in parallel, it should be understood that these steps, in embodiments, may occur serially. The process then reverts to step 1710. If, at step 1715, the measured properties/conditions are not sufficient, at step 1735, channel inlet and/or outlet pumps may be activated, and at step 1740, a fluid treatment may be initiated. While these steps are shown in parallel, it should be understood that these steps, in embodiments, may occur serially. At step 1745, a determination of nominal operation is performed, e.g., by a computer system monitoring operational parameters. If, at step 1745, operation is determined to be nominal, the process continues at step 1710. If, at step 1745, operation is determined to not be nominal (e.g., a pump failure is detected and/or low additive layers are detected), at step 1750, an alert may flagged (e.g., alarm, light, and/or sound).

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A corrosion-resistant cover system, comprising:
 a corrosion-resistant cover structured and configured to be arrangeable around an object having one or more metallic surfaces that are susceptible to corrosion,
 wherein the corrosion-resistant cover is operable to provide increased corrosion resistance to the object by preventing contact between the one or more metallic surfaces and ambient conditions of an underwater environment exterior to the corrosion-resistant cover,
 wherein the corrosion-resistant cover is operable to provide one or more fluid channels between an interior of the corrosion-resistant cover and the one or more metallic surfaces of the object,
 the cover system further comprising one or more pumping assemblies arranged on the cover and operable to inject a treated fluid into the one or more fluid channels,
 wherein the one or more pumping assemblies each comprise a pump operable to move yet-treated fluid or the treated fluid through the pumping assembly,
 wherein the one or more pumping assemblies each comprise an inlet in communication with an ambient fluid exterior to the corrosion-resistant cover and an outlet in communication with the one or more fluid channels.

2. The corrosion-resistant cover system of claim 1, wherein the one or more pumping assemblies each further comprise one or more fluid treaters operable to receive an incoming fluid and treat the incoming fluid in order to change one or more properties of the incoming fluid, and to output the treated fluid.

3. The corrosion-resistant cover system of claim 2, wherein the one or more fluid treaters comprise at least one of a desalinizator, a deoxidizer, a pH adjustor, and an additive supplier.

4. The corrosion-resistant cover system of claim 1, wherein the one or more pumping assemblies further comprises a controller operable to receive instructions and control one or more pumps and one or more fluid treaters of the pumping assembly.

5. The corrosion-resistant cover system of claim 1, wherein the one or more pumping assemblies further comprises a fluid tester operable to determine and/or quantify properties of an incoming fluid.

6. The corrosion-resistant cover system of claim 1, wherein the one or more pumping assemblies further comprises a heat pump and a heat exchanger, wherein the heat exchanger is configured to receive thermal energy from the heat pump and transfer the thermal energy to an incoming fluid or to the treated fluid, to increase a temperature of the incoming fluid or the treated fluid.

7. The corrosion-resistant cover system of claim 1, wherein the one or more pumping assemblies further comprises a heat exchanger and a turbine, wherein the heat exchanger is configured to transfer received thermal energy to the turbine for driving the treated fluid through the one or more channels.

8. The corrosion-resistant cover system of claim 1, further comprising one or more baffles depending from an interior surface of the corrosion-resistant cover, which are operable to prevent a backflow of treated liquid within the one or more channels.

9. The corrosion-resistant cover system of claim 1, further comprising one or more studs structured and arranged within the channel to maintain a gap between the corrosion-resistant cover and the one or more metallic surfaces of the object.

10. The corrosion-resistant cover system of claim 1, further comprising one or more helical fins structured and arranged within the channel to promote a circumferential component of flow to the treated fluid within the channel.

11. The corrosion-resistant cover system of claim 1, further comprising studs that do not traverse an entire width of the channel structured and arranged within the channel to induce mixing and/or homogeneity of the treated fluid passing through the channel.

12. The corrosion-resistant cover system of claim 1, wherein the object comprises a hollow metal tube of a transportation system in the underwater environment.

13. The corrosion-resistant cover system of claim 1, wherein the corrosion-resistant cover comprises an accretion layer formed on an outer surface of the metal tube.

14. The corrosion-resistant cover system of claim 1, wherein the pumping assembly is arranged on an outer surface of the cover.

15. A method of providing corrosion resistance to a metal tube in an underwater environment, the method comprising:
arranging a corrosion-resistant cover around the metal tube such that the metal tube is protected from contact with ambient seawater of the underwater environment, and so that one or more fluid channels are provided between an interior surface of the corrosion-resistant cover and an outer surface of the metal tube;
intaking ambient seawater into a pumping assembly arranged on the cover and comprising one or more pumps and one or more fluid treatment devices, wherein the pumping assembly comprises an inlet in communication with an ambient fluid exterior to the corrosion-resistant cover and an outlet in communication with the one or more fluid channels;
treating the ambient seawater with the one or more fluid treatment devices to produce a treated fluid having reduced corrosive properties; and
injecting the treated fluid into the one or more channels via the outlet such that the treated fluid having reduced corrosive properties is in contact with the outer surface of the metal tube.

16. The method of claim 15, wherein the treated fluid having reduced corrosive properties has at least one of: a lowered salt concentration than that of the ambient seawater, a reduced oxygen content than that of the ambient seawater, and an increased a pH value than that of the ambient seawater.

17. The method of claim 15, further comprising applying an electrical current to the outer surface of the metal tube while passing the treated fluid through the one or more channels to form an accretion layer on the outer surface of the metal tube.

18. The method of claim 15, wherein the pumping assembly is arranged on an outer surface of the cover.

* * * * *